United States Patent
Terazono et al.

(10) Patent No.: US 12,512,919 B2
(45) Date of Patent: Dec. 30, 2025

(54) NON-TRANSITORY COMPUTER READABLE STORAGE MEDIUM, INFORMATION PROCESSING DEVICE, INFORMATION PROCESSING METHOD, AND INFORMATION PROCESSING SYSTEM

(71) Applicant: TDK CORPORATION, Tokyo (JP)

(72) Inventors: Yasushi Terazono, Tokyo (JP); Yuki Mizuhara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 408 days.

(21) Appl. No.: 18/078,555

(22) Filed: Dec. 9, 2022

(65) Prior Publication Data
US 2023/0188232 A1   Jun. 15, 2023

(30) Foreign Application Priority Data
Dec. 13, 2021  (JP) ................................ 2021-201806

(51) Int. Cl.
H04B 17/345   (2015.01)
(52) U.S. Cl.
CPC .................................. H04B 17/345 (2015.01)
(58) Field of Classification Search
CPC .................................................. H04B 17/345
See application file for complete search history.

(56) References Cited

U.S. PATENT DOCUMENTS

2005/0114901 A1* 5/2005 Yui ...................... H04N 21/434
                                                  348/E5.002
2017/0316329 A1   11/2017 Toyama
2018/0014738 A1   1/2018 Tanaka et al.
2020/0281490 A1   9/2020 Kataoka et al.
2021/0247366 A1   8/2021 Nishikino et al.

FOREIGN PATENT DOCUMENTS

| | | |
|---|---|---|
| CN | 107209508 A | 9/2017 |
| EP | 0 621 493 A1 | 10/1994 |
| JP | 2005-291795 A | 10/2005 |
| JP | 2006-317194 A | 11/2006 |
| JP | 2017-022557 A | 1/2017 |
| JP | 2018-189448 A | 11/2018 |
| WO | 2019-189429 A1 | 10/2019 |

OTHER PUBLICATIONS

May 11, 2023 extended Search Report issued in European Patent Application No. 22212808.4.

* cited by examiner

*Primary Examiner* — Duc C Ho
(74) *Attorney, Agent, or Firm* — Oliff PLC

(57) ABSTRACT

A non-transitory computer readable storage medium storing a program capable of accurately detecting unexpected noise included in a target signal is provided. The program causes a computer to implement an acquisition function of acquiring data of a plurality of channels that are three or more channels, a selection function of selecting data of a single channel as attention channel data from the data of the plurality of channels acquired in the acquisition function, and a dissimilarity calculation function of calculating dissimilarity for data of two or more channels within data of channels not selected in the selection function in each prescribed range of the attention channel data with respect to the attention channel data selected in the selection function.

21 Claims, 9 Drawing Sheets

NON-TRANSITORY COMPUTER READABLE STORAGE MEDIUM, INFORMATION PROCESSING DEVICE, INFORMATION PROCESSING METHOD, AND INFORMATION PROCESSING SYSTEM

CROSS-REFERENCE TO RELATED APPLICATION

Priority is claimed on Japanese Patent Application No. 2021-201806, filed Dec. 13, 2021, the content of which is incorporated herein by reference.

BACKGROUND OF THE INVENTION

Field of the Invention

The present disclosure relates to a non-transitory computer readable storage medium, an information processing device, an information processing method, and an information processing system.

Description of Related Art

Electrical signals, magnetic signals, or the like are measured using a plurality of sensors.

Also, noise included in a measured signal is removed.

In a multi-sensor signal abnormality detection device described in Patent Document 1, when signals are measured (detected) by a plurality of sensors, a noise level that is a variation component between the sensors is calculated (see Patent Document 1).

PATENT DOCUMENTS

[Patent Document 1] Japanese Unexamined Patent Application, First Publication No. 2006-317194

SUMMARY OF THE INVENTION

However, in the related art, the accuracy of detecting unexpected noise included in a measured signal and the like may be insufficient.

Here, the unexpected noise is unexpected noise that occurs at a low frequency for each sensor. The unexpected noise may have, for example, an amplitude that is not significantly different from a peak of a target signal of interest included in the measured signal.

In the related art, when this unexpected noise is detected and removed, for example, a process of weakening an influence of unexpected noise by performing an additive average operation or a process of determining unexpected noise by human visual inspection and excluding a position of the determined unexpected noise is performed.

As a specific example, a peak of a target signal of interest may occur at prescribed intervals in the measured signal. In this case, if unexpected noise having an amplitude higher than the peak of the target signal of interest is generated at a timing when the unexpected noise overlaps the peak of the target signal of interest, it is not possible to determine the peak of the target signal of interest. On the other hand, when the amplitude of the unexpected noise is small, it may be difficult to determine the unexpected noise.

The present disclosure has been made in consideration of such circumstances and an objective of the present disclosure is to provide a non-transitory computer readable storage medium, an information processing device, an information processing method, and an information processing system capable of accurately detecting unexpected noise included in a target signal.

According to an aspect, there is provided a non-transitory computer readable storage medium storing a program for causing a computer to implement: an acquisition function of acquiring data of a plurality of channels that are three or more channels; a selection function of selecting data of a single channel as attention channel data from the data of the plurality of channels acquired in the acquisition function; and a dissimilarity calculation function of calculating dissimilarity for data of two or more channels within data of channels not selected in the selection function in each prescribed range of the attention channel data with respect to the attention channel data selected in the selection function.

According to an aspect, there is provided an information processing device including: an acquisition unit configured to acquire data of a plurality of channels that are three or more channels; a selection unit configured to select data of a single channel as attention channel data from the data of the plurality of channels acquired by the acquisition unit; and a dissimilarity calculation unit configured to calculate dissimilarity for data of two or more channels within data of channels not selected by the selection unit in each prescribed range of the attention channel data with respect to the attention channel data selected by the selection unit.

According to an aspect, there is provided an information processing method including: acquiring, by an acquisition unit of an information processing device, data of a plurality of channels that are three or more channels; selecting, by a selection unit of the information processing device, data of a single channel as attention channel data from the data of the plurality of channels acquired by the acquisition unit; and calculating, by a dissimilarity calculation unit of the information processing device, dissimilarity for data of two or more channels within data of channels not selected by the selection unit in each prescribed range of the attention channel data with respect to the attention channel data selected by the selection unit.

According to an aspect, there is provided an information processing system including a sensor unit configured to measure data of a plurality of channels that are three or more channels and an information processing device, wherein the information processing device includes: an acquisition unit configured to acquire the data of the plurality of channels that are the three or more channels measured by the sensor unit; a selection unit configured to select data of a single channel as attention channel data from the data of the plurality of channels acquired by the acquisition unit; and a dissimilarity calculation unit configured to calculate dissimilarity for data of two or more channels within data of channels not selected by the selection unit in each prescribed range of the attention channel data with respect to the attention channel data selected by the selection unit.

According to the present disclosure, unexpected noise included in a target signal can be accurately detected in a non-transitory computer readable storage medium, an information processing device, an information processing method, and an information processing system.

DETAILED DESCRIPTION OF THE INVENTION

Hereinafter, embodiments of the present disclosure will be described with reference to the drawings.

[Information Processing System]

Figure 1:
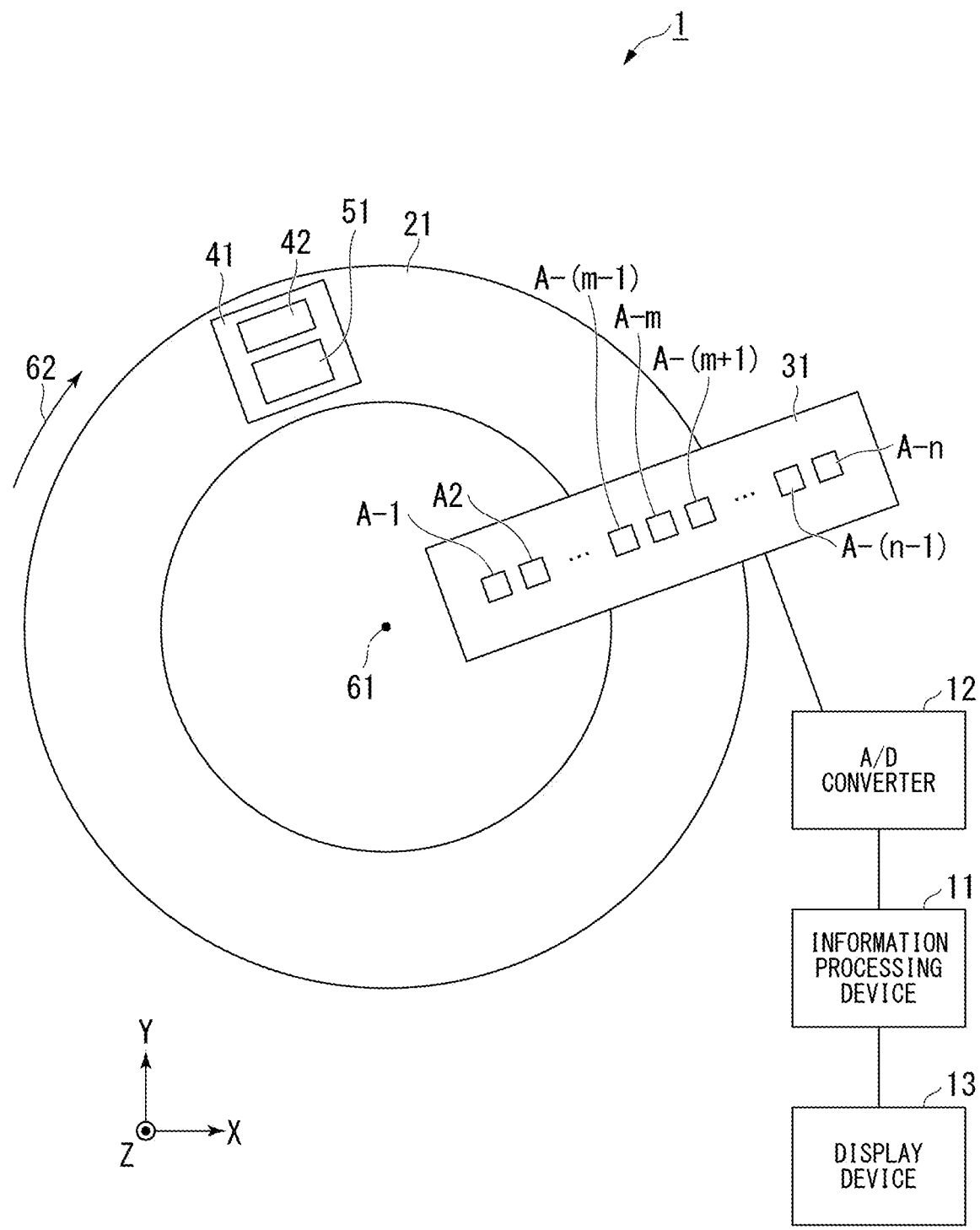
FIG. 1 is a diagram showing a schematic configuration of an information processing system according to an embodiment.

FIG. 1 is a diagram showing a schematic configuration of an information processing system 1 according to an embodiment.

In FIG. 1, an XYZ coordinate system, which is a three-dimensional Cartesian coordinate system, is shown for the convenience of description.

In the present embodiment, it is assumed that a direction parallel to a Z-axis is parallel to a gravity direction. Also, in the present embodiment, it is assumed that a positive direction of the Z-axis is an upward direction and a negative direction of the Z-axis is a downward direction.

The information processing system 1 includes an information processing device 11, an analog to digital (A/D) converter 12, a display device 13, a belt conveyor 21, a sensor unit 31, a table 41, and a current supply unit 42.

Also, the information processing system 1 may be referred to as, for example, a measurement system.

The sensor unit 31 includes n (n is an integer of 3 or more) sensors A-1 to A-n that are three or more sensors. In the present embodiment, one channel signal is measured by each of the sensors A-1 to A-n. Signals of a total of n channels are measured in all the sensors A-1 to A-n.

Also, the measurement may be referred to as detection or the like.

Also, the plurality of channels may be referred to as a multi-channel.

Also, the number of channels may be any value of three or more or may be, for example, dozens.

Also, in the present embodiment, unexpected noise can be generated in the measured signals of the sensors A-1 to A-n.

FIG. 1 shows a target object 51 to be measured. Here, the information processing system 1 does not include the target object 51 in the present embodiment, but the information processing system 1 may be regarded as including the target object 51 as another example.

Also, in FIG. 1, a rotation center axis 61 of the belt conveyor 21 and a rotation direction 62 of the belt conveyor 21 are shown.

The belt conveyor 21 is a device that rotates a wide belt shaped in a ring shape on a trolley (not shown) and places and moves an object to be conveyed on the belt.

In the example of FIG. 1, one surface of the belt is arranged parallel to an XY plane. The surface is a surface on which the object to be conveyed is placed.

In the example of FIG. 1, the belt conveyor 21 has a circular shape with respect to a surface parallel to the XY plane and rotates in the prescribed rotation direction 62 about the rotation center axis 61. In the example of FIG. 1, the rotation center axis 61 is in a direction parallel to the Z-axis.

The sensor unit 31 has a line-shaped multi-channel sensor. Such a multi-channel sensor may be referred to as, for example, a sensor array.

Each of the n sensors A-1 to A-n corresponds to its own channel.

In the sensor unit 31, the n sensors A-1 to A-n are arranged in a straight line at prescribed intervals. The prescribed intervals may be, for example, equal intervals. When viewed from the direction parallel to the Z-axis, the straight line intersects a part of the belt of the belt conveyor 21. At a position of this intersection, the straight line is perpendicular and orthogonal to the rotation direction of a part of the belt.

In the example of FIG. 1, an $m^{th}$ sensor A-m of the n sensors A-1 to A-n is arranged near a radial center of the belt. Here, m is the middle number, i.e., $(n+1)/2$, when n is an odd number and m is a number near the center, i.e., $n/2$ or $(1+n/2)$, when n is an even number.

The sensors A-1 to A-n measure the same physical quantity. The physical quantity may be any physical quantity and may be, for example, an electrical signal, a magnetic signal, a sound signal, or the like.

In data of such n channels, for example, there may be similarity in data of two adjacent channels or there may be similarity in data of two or more adjacent channels.

In the present embodiment, each of the sensors A-1 to A-n is a sensor (a magnetic sensor) that measures a magnetic signal. In the present embodiment, each of the sensors A-1 to A-n is an example of a foreign substance detection sensor that detects a foreign substance.

Each of the sensors A-1 to A-n outputs a measurement result signal (a measured signal) to the A/D converter 12 in the form of an analog signal. The measured signal may be, for example, a voltage signal.

Also, the plurality of sensors A-1 to A-n may include sensors that measure different physical quantities.

The table 41 is placed at a prescribed position on the upper surface of the belt conveyor 21.

Also, a current supply unit 42 is provided on the upper surface of the table 41 or the like.

Also, the target object 51 is placed on the upper surface of the table 41.

In the present embodiment, even if the belt conveyor 21 rotates, a relative position of the target object 51 to the belt conveyor 21 is unchanged. Also, in the present embodiment, it is assumed that a relative position of the table 41 to the belt conveyor 21 is also unchanged.

In the example of FIG. 1, when the belt conveyor 21 rotates, the target object 51 also rotates in the prescribed rotation direction 62 about the rotation center axis 61. Thereby, when viewed from the direction parallel to the Z-axis, the target object 51 rotates along a circular path of the belt conveyor 21.

In the present embodiment, it is assumed that a rotational speed of the belt conveyor 21 is uniform. Also, as another example of the configuration, a configuration in which the rotational speed of the belt conveyor 21 can change may be used. In this case, a process considering a change in the rotational speed in the information processing device 11 or the like (for example, a process of regulating the progress of a value of a time axis) may be performed.

Here, the target object 51 is an object serving as a measurement target, and, for example, a sample serving as an inspection target at a factory or the like.

In the present embodiment, the current supply unit 42 supplies a current to the target object 51 all the time. The current may be, for example, a current having a certain amplitude. Thereby, the target object 51 generates a magnetic signal all the time.

Subsequently, this magnetic signal is measured by the plurality of sensors A-1 to A-n.

In the present embodiment, when a foreign substance or scratches are located on the target object 51, the target object 51 generates magnetism different from the magnetism that occurs in the normal case. Here, the normal case is a case where no foreign substance or scratches are located on the target object 51.

The target object 51 may be any sample through which an electric current is flowing and may be, for example, a metallic material component.

On the other hand, when no foreign substance or scratches are located on the target object 51, the target object 51 generates magnetism that occurs at normal times. A waveform of the magnetic signal measured by each of the sensors A-1 to A-n according to the magnetism may be acquired in advance using, for example, a prescribed calculation operation or the like.

In the example of FIG. 1, when the target object 51 rotates and comes to a position where the plurality of sensors A-1 to A-n are located, the target object 51 passes across a line lined with the plurality of sensors A-1 to A-n. At this time, each of the sensors A-1 to A-n measures a magnetic signal according to magnetism (a magnetic field) generated by the target object 51.

Here, each of the sensors A-1 to A-n can measure a magnetic signal even if the target object 51 is located at a distant position, but it is assumed that a particularly large magnetic signal peak is measured when the target object 51 is located at a nearby position in the present embodiment.

In the present embodiment, one particularly large magnetic signal peak is measured every time the target object 51 passes across a line lined with the plurality of sensors A-1 to A-n.

Also, in the present embodiment, the belt conveyor 21 rotates a plurality of times for one round of the same target object 51. Thereby, in the magnetic signal measured by each of the sensors A-1 to A-n, a similar peak appears every time the belt conveyor 21 rotates one round if unexpected noise does not occur. This peak appears periodically when the rotational speed of the belt conveyor 21 is uniform.

However, in the present embodiment, the case where unexpected noise can be generated in the magnetic signal measured by each of the sensors A-1 to A-n is shown.

As another example, in the present embodiment, the magnetic signal when the target object 51 passes across the line lined with the plurality of sensors A-1 to A-n once can also be processed with respect to the same target object 51. In this case, for example, one peak in the magnetic signal may be measured by each of the sensors A-1 to A-n or a magnetic signal part of one peak may be extracted and processed by the information processing device 11 from a measurement result after a plurality of peaks in the magnetic signal are measured by each of the sensors A-1 to A-n.

Although the case where the current supply unit 42 is provided on the table 41 is shown in the example of FIG. 1, the current supply unit 42 may be provided at any other position as another example of the configuration.

Although the current supply unit 42 supplies a current to the target object 51 all the time in the present embodiment, the current supply unit 42 may be configured to supply a current to the target object 51 when the target object 51 is located near the sensor unit 31 as another example of the configuration. That is, it is only necessary for the plurality of sensors A-1 to A-n to measure a magnetic signal generated by the target object 51.

Although the case where the table 41 is placed on the upper surface of the belt conveyor 21 and the target object 51 is placed on the upper surface of the table 41 is shown in the example of FIG. 1, the target object 51 may be placed on the upper surface of the belt conveyor 21 as another example of the configuration.

The A/D converter 12 inputs analog signals output from the sensors A-1 to A-n.

The A/D converter 12 performs an A/D conversion process of converting the analog signals input from the sensors A-1 to A-n into digital signals and inputs the digital signals to the information processing device 11.

Here, a case where the A/D converter 12 is provided between the sensor unit 31 and the information processing device 11 is shown in the present embodiment, but other configurations may be used.

As an example, the A/D conversion function of the A/D converter 12 is provided in the sensor unit 31 and a measurement result signal may be input from each of the sensors A-1 to A-n to the information processing device 11 in the form of a digital signal.

As another example, the A/D conversion function of the A/D converter 12 is provided in the information processing device 11 and the measurement result signal may be input from each of the sensors A-1 to A-n to the information processing device 11 in the form of an analog signal and the analog signal may be converted into a digital signal in the A/D conversion function.

The information processing device 11 inputs a digital signal (data) output from the A/D converter 12.

The information processing device 11 performs a prescribed process using the input digital signal (data).

Also, the information processing device 11 outputs information serving as a display target to the display device 13.

The display device 13 has a screen and has a function of displaying information on the screen.

In the present embodiment, the display device 13 inputs information output from the information processing device 11 and displays the information on the screen.

As another example, the display device 13 may display the information as printed matter on a paper surface or the like by printing the information output from the information processing device 11.

Here, the case in which one target object 51 is placed on the belt conveyor 21 is shown to simplify the description in the present embodiment, but a target object may be placed at each of different positions on the belt conveyor 21 and a plurality of target objects may be placed in total as another example of the configuration. In this case, for example, a process similar to that for the target object 51 according to the present embodiment may be performed for each target object.

Although the case in which the sensor unit 31 is provided at one position on the belt conveyor 21 is shown to simplify the description in the present embodiment, the sensor unit may be provided at each of a plurality of positions on the belt conveyor 21 as another example of the configuration. In this case, for example, a process similar to that for the sensor unit 31 according to the present embodiment may be performed for each sensor unit.

<Information Processing Device>

Figure 2:
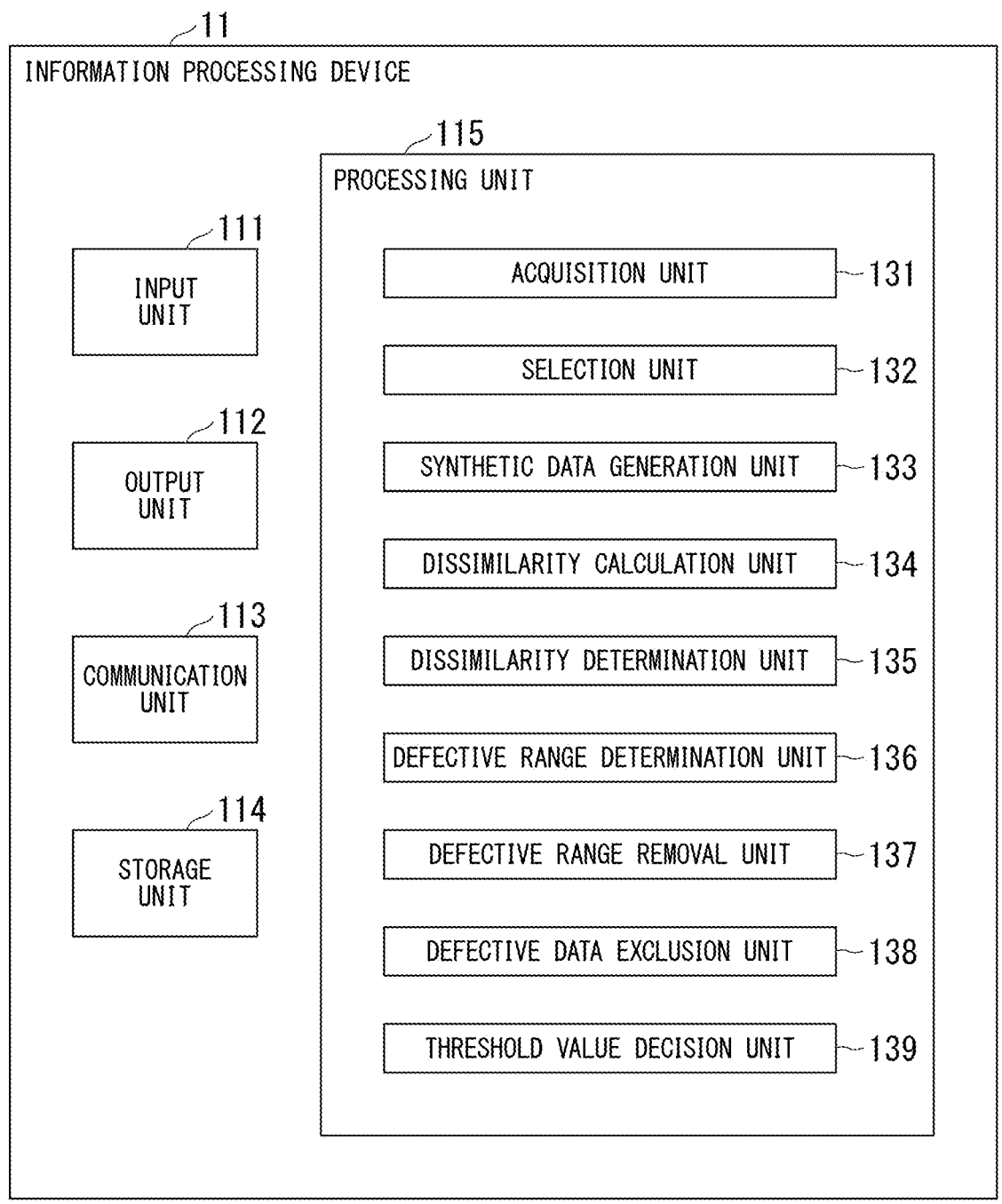
FIG. 2 is a diagram showing an example of a functional block of the information processing device according to the embodiment.

FIG. 2 is a diagram showing an example of a functional block of the information processing device 11 according to the embodiment.

The information processing device 11 includes an input unit 111, an output unit 112, a communication unit 113, a storage unit 114, and a processing unit 115.

The processing unit 115 includes an acquisition unit 131, a selection unit 132, a synthetic data generation unit 133, a dissimilarity calculation unit 134, a dissimilarity determination unit 135, a defective range determination unit 136, a defective range removal unit 137, a defective data exclusion unit 138, and a threshold value decision unit 139.

In the present embodiment, the information processing device 11 is configured using a computer that operates using hardware such as a processor and software such as a program.

The information processing device 11 includes a processor such as a central processing unit (CPU) and executes various types of processes by executing a prescribed program using the processor.

The program may be stored, for example, in the storage unit 114.

The input unit 111 inputs information.

The input unit 111 may include operation units, for example, such as a keyboard and a mouse, and input information corresponding to an operation performed on the operation unit by a user.

Also, the input unit 111 may be connected to, for example, an external device, and input information output from the device. The device may be, for example, a portable storage device.

The output unit 112 outputs information.

The output unit 112 may be connected to, for example, an external device, and may output information to the device. The device may be, for example, the display device 13. Also, the device may be, for example, a portable storage device.

The communication unit 113 has a function of performing communication.

Here, a case in which a reception function of the communication unit 113 and the input unit 111 are provided as separate functional units is shown in the present embodiment, but the reception function of the communication unit 113 may be included in the input unit 111 as another example of the configuration.

Likewise, although a case where a transmission function of the communication unit 113 and the output unit 112 are provided as separate functional units is shown in the present embodiment, the transmission function of the communication unit 113 may be included in the output unit 112 as another example of the configuration.

The storage unit 114 stores information.

Here, the case in which the information processing device 11 uses the internal storage unit 114 is indicated in the present embodiment, but the information processing device 11 may use an external storage unit (not shown) as another example of the configuration.

The acquisition unit 131 acquires data (measurement result data) of a plurality of channels that are three or more channels.

In the present embodiment, the acquisition unit 131 acquires a digital signal (measurement result data) input from the A/D converter 12 to the information processing device 11.

Here, in the present embodiment, the information processing device 11 inputs a digital signal (measurement result data) output from the A/D converter 12 by the input unit 111 (or in the reception function of the communication unit 113).

The selection unit 132 selects data of a single channel (i.e., one channel) as attention channel data from data of a plurality of channels acquired by the acquisition unit 131.

In the present embodiment, the selection unit 132 selects, for example, pieces of data of n channels one by one by performing a switching process in a prescribed sequence, thereby selecting data of all channels in total.

Also, the attention channel may be referred to as a target channel or the like.

The synthetic data generation unit 133 generates synthetic data that is a result of synthesizing data of two or more channels within data of channels not selected by the selection unit 132.

Here, the synthetic data generation unit 133 may generate synthetic data that is, for example, a result of synthesizing all the data of the channels not selected by the selection unit 132.

Also, the synthetic data generation unit 133 may generate synthetic data that is, for example, a result of synthesizing all normal data (for example, data that has not been determined to be defective) within the data of the channels not selected by the selection unit 132.

The synthetic data generation unit 133 may generate synthetic data by regulating a weight for synthesizing data of two or more channels within data of channels not selected by the selection unit 132 according to, for example, an error least squares approximation process for the attention channel data.

In other words, the synthetic data generation unit 133 may regulate a weight of each piece of the data to be synthesized so that the synthetic data becomes data close (e.g., closest) to the attention channel data when the data of the two or more channels within the data of the channels not selected by the selection unit 132 is synthesized.

Here, in the error least squares approximation process, a process of calculating a result of obtaining a sum of squares of differences between values corresponding to each other (paired values between two pieces of data) (an error sum of squares) for all pairs with respect to two pieces of data serving as a comparison target (the attention channel data and the synthetic data in the present example) and regulating a weight when synthetic data is created so that the error sum of squares is minimized is performed. In the present example, the values corresponding to each other are values of the same sample (the same time).

Although the error least squares approximation process is used to generate data close to the attention channel data as synthetic data in the present embodiment, other approximation methods may be used.

The dissimilarity calculation unit 134 calculates dissimilarity for data of two or more channels within data of channels not selected by the selection unit 132 in each prescribed range of attention channel data with respect to attention channel data selected by the selection unit 132.

Here, the dissimilarity calculation unit 134 may calculate dissimilarity for the synthetic data generated by the synthetic data generation unit 133 as the dissimilarity.

In the present embodiment, dissimilarity is a value for evaluating a degree to which two pieces of data are not similar.

The dissimilarity may be referred to as, for example, a degree of deviation, a distance, or the like.

Also, instead of the dissimilarity, similarity, which is a value for evaluating a degree to which two pieces of data are similar, may be used. In this case, for example, a process may be performed so that the dissimilarity decreases as the similarity increases and the dissimilarity increases as the similarity decreases.

The prescribed range may include two or more different ranges.

The prescribed range may be a range for one sample of attention channel data.

The data of the plurality of channels may be time-series data. In this case, the prescribed range may be a range of a time period.

As another example of the configuration, the data of the plurality of channels may be data arranged according to a spatial arrangement. In this case, the prescribed range may be a spatial range.

Various methods may be used as methods for calculating dissimilarity by the dissimilarity calculation unit 134.

As an example, the dissimilarity calculation unit 134 may calculate the dissimilarity based on a sum of absolute values of differences between the attention channel data and the synthetic data.

As an example, the dissimilarity calculation unit 134 may calculate the dissimilarity based on a sum of squares of differences between the attention channel data and the synthetic data.

As an example, the dissimilarity calculation unit 134 may calculate the dissimilarity based on a maximum value of absolute values of differences between the attention channel data and the synthetic data.

As an example, the dissimilarity calculation unit 134 may calculate the dissimilarity based on a difference between a feature quantity of the attention channel data and a feature quantity of the synthetic data.

As an example, the dissimilarity calculation unit 134 may calculate the dissimilarity based on a difference between a probability distribution of the attention channel data and a probability distribution of the synthetic data.

As an example, the dissimilarity calculation unit 134 may calculate the dissimilarity based on the difference between the power spectrum of the attention channel data and the power spectrum of the synthetic data.

As an example, the dissimilarity calculation unit 134 may calculate the dissimilarity using an arithmetic equation for causing samples of the attention channel data and the synthetic data to correspond to each other.

The dissimilarity determination unit 135 determines whether or not the dissimilarity calculated by the dissimilarity calculation unit 134 is greater than a prescribed threshold value.

The defective range determination unit 136 determines that a range in which the dissimilarity is determined to be greater than the threshold value by the dissimilarity determination unit 135 is a defective range.

Although the case where the dissimilarity determination unit 135 and the defective range determination unit 136 are different functional units is shown in the present embodiment, the dissimilarity determination unit 135 and the defective range determination unit 136 may be configured as the same functional unit (a common functional unit) as another example of the configuration.

The defective range removal unit 137 replaces a data part of the range determined to be the defective range by the defective range determination unit 136 with a data part of a result of synthesizing the data of the two or more channels within the data of the channels not selected by the selection unit 132.

The defective data exclusion unit 138 excludes the attention channel data including the range determined to be the defective range by the defective range determination unit 136 when a prescribed process based on a plurality of pieces of the attention channel data is executed.

Here, various processes may be used as the prescribed process and, for example, an averaging process may be used.

Also, as the process of the defective range removal unit 137 and the process of the defective data exclusion unit 138, for example, any one process may be performed. In this case, the functional unit of the other process (the defective range removal unit 137 or the defective data exclusion unit 138) may not be provided in the information processing device 11.

The threshold value decision unit 139 has a function of determining a threshold value on the basis of a statistical result of dissimilarity of each range of attention channel data.

Here, for example, the prescribed threshold value to be used by the dissimilarity determination unit 135 may be preset or may be decided on by the threshold value decision unit 139.

The information processing device 11 may cause the display device 13 to display information by outputting information for displaying data of a measurement result acquired by the acquisition unit 131 of the processing unit 115, data during a process performed by the processing unit 115, data of a result of a process performed by the processing unit 115, data related thereto, and the like to the display device 13 using the output unit 112.

Although the case where the display device 13 and the information processing device 11 are separate has been described in the present embodiment, a configuration in which the display device 13 is integrated with the information processing device 11 may be used as another example of the configuration.

[Unexpected Noise]

Figure 3:
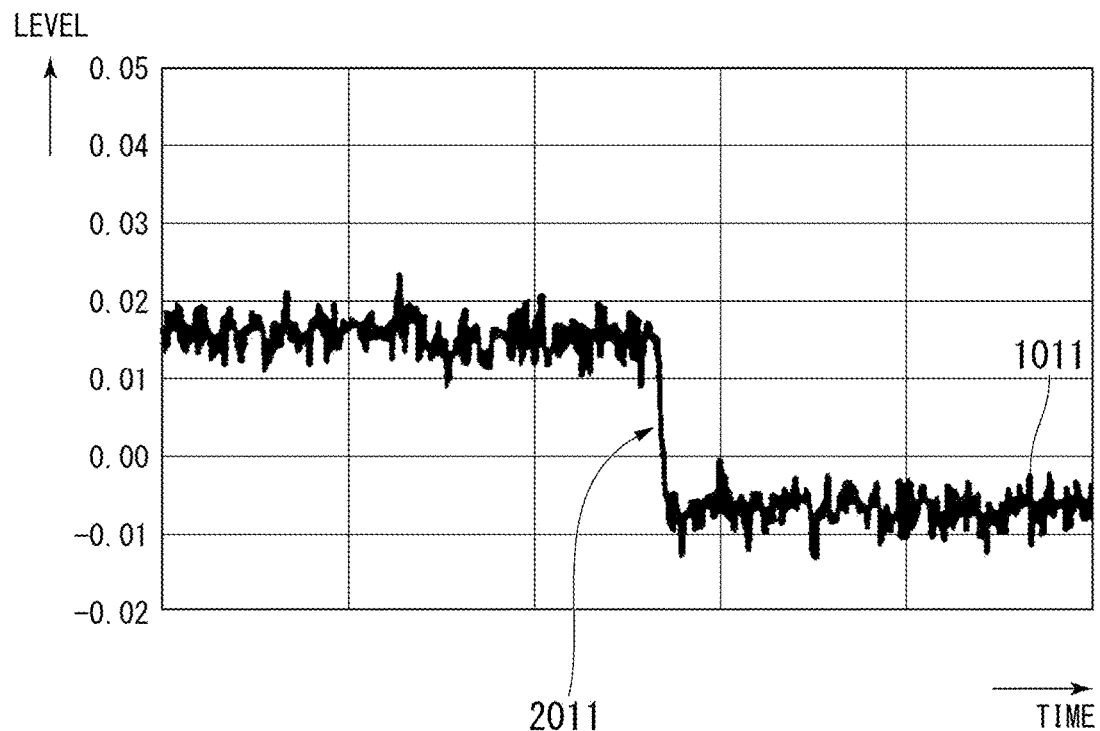
FIG. 3 is a diagram showing an example of unexpected noise.

FIG. 3 is a diagram showing an example of unexpected noise.

In the graph shown in FIG. 3, the horizontal axis represents time and the vertical axis represents a level. The level is, for example, an amplitude of a signal and can have positive and negative values.

In FIG. 3, an example of a measured signal 1011 of one channel is shown.

Also, an example of unexpected noise 2011 generated in the measured signal 1011 of the channel is shown in FIG. 3.

The unexpected noise 2011 may have, for example, a positive value or a negative value. In the example of FIG. 3, the unexpected noise 2011 has a negative value.

Although a state in which the measured signal 1011 falls to the negative side due to an influence of the unexpected noise 2011 is shown in the example of FIG. 3, it returns to a state where there is no influence of the unexpected noise 2011 again thereafter (the time is more advanced than shown in FIG. 3 and the advanced time is omitted from the drawing).

Also, the measured signal 1011 and the unexpected noise 2011 shown in FIG. 3 are illustrative and do not necessarily show an exact signal waveform.

As a specific example, in a magneto resistive (MR) sensor, which is a magnetic sensor to which the magneto resistive effect is applied, unexpected noise may be generated due to a jump of the state inside of a sensor module. Such unexpected noise may be referred to as, for example, jump-like noise or the like.

In the MR sensor, a small magnet is provided in the sensor element and unexpected noise is generated at a timing when the magnetism of the magnet is inverted.

The unexpected noise generated at the output of each channel is specific to each channel and does not affect the output of the other channels.

In the unexpected noise, the output level changes rapidly like a jump.

Unexpected noise occurs infrequently. There is a specific example in which a frequency of occurrence of unexpected noise is less than once in every 100 cycles of a signal serving as a target of interest (a target signal of interest), but this is an example for description and the frequency of occurrence of unexpected noise is not limited thereto.

Because unexpected noise occurs unexpectedly, it does not occur periodically.

[Specific Example of Measured Signal Processing]

A specific example of measured signal processing performed by the information processing device 11 will be described with reference to FIGS. 4 to 10.

Also, signal waveforms of measured signals shown in FIGS. 4 to 10 and the like are examples for description and do not necessarily show exact signal waveforms.

In the present embodiment, the measured signal becomes a signal of a target (a target signal) for detecting (determining) unexpected noise.

<Measured Signals of Four Channels>

In the present example, processing of measured signals of four channels will be described as an example in which measured signals of a plurality of channels are processed to simplify the description.

In the present example, the four channels will be described as a channel P1, a channel P2, a channel P3, and a channel P4.

Also, in the present example, one channel that is attracting attention among these four channels P1 to P4 will be referred to and described as an attention channel and the other three channels (channels that are not attracting attention) will be referred to and described as non-attention channels. The attention channel is switched between the four channels P1 to P4.

In the example of FIGS. 4 to 10, a case where the channel P1 is an attention channel will be described. In the present example, the channel P1, the channel P2, the channel P3, and the channel P4 will be described as the attention channel P1, the non-attention channel P2, the non-attention channel P3, and the non-attention channel P4, respectively.

Also, in the present example, the case where unexpected noise is generated in the measured signal of one channel P1 and unexpected noise is not generated in the measured signals of the other three channels is shown.

The information processing device 11 acquires data of measured signals of the four channels P1 to P4 using the acquisition unit 131.

In the present example, the information processing device 11 selects the data of the measured signal of one channel P1 as the data of the measured signal of the attention channel P1 using the selection unit 132.

Figure 4:
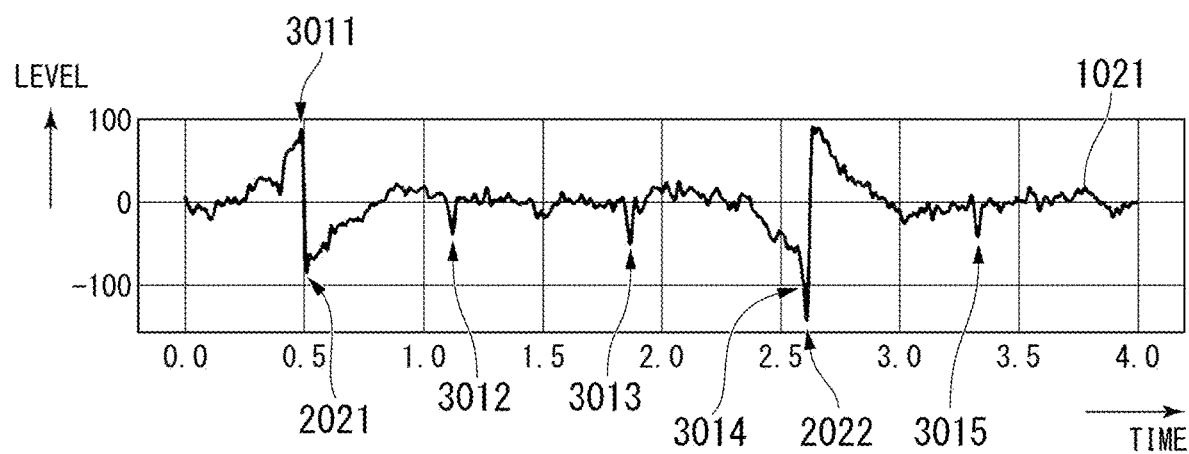
FIG. 4 is a diagram showing an example of a measured signal of an attention channel P1 according to the embodiment.

FIG. 4 is a diagram showing an example of a measured signal 1021 of the attention channel P1 according to the embodiment.

Figure 5:
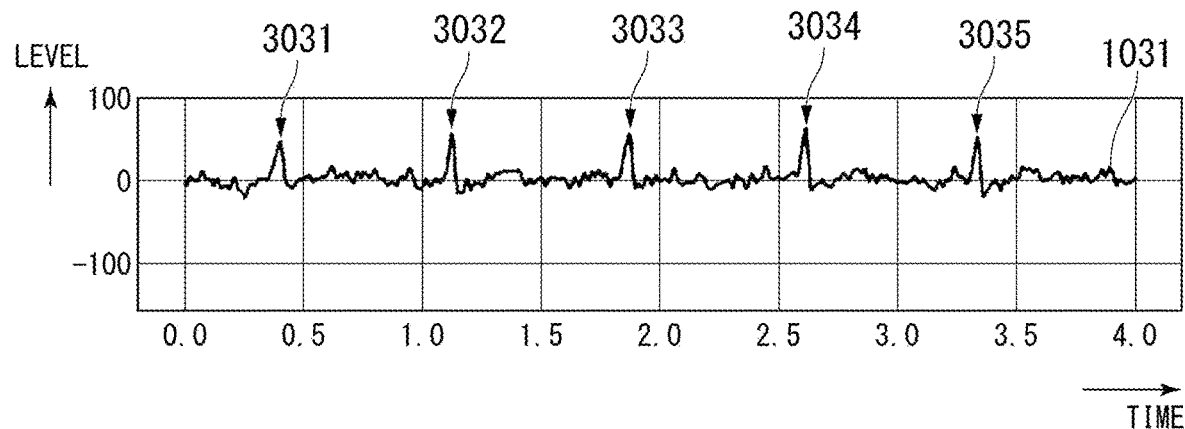
FIG. 5 is a diagram showing an example of a measured signal of a non-attention channel P2 according to the embodiment.

FIG. 5 is a diagram showing an example of a measured signal 1031 of the non-attention channel P2 according to the embodiment.

Figure 6:
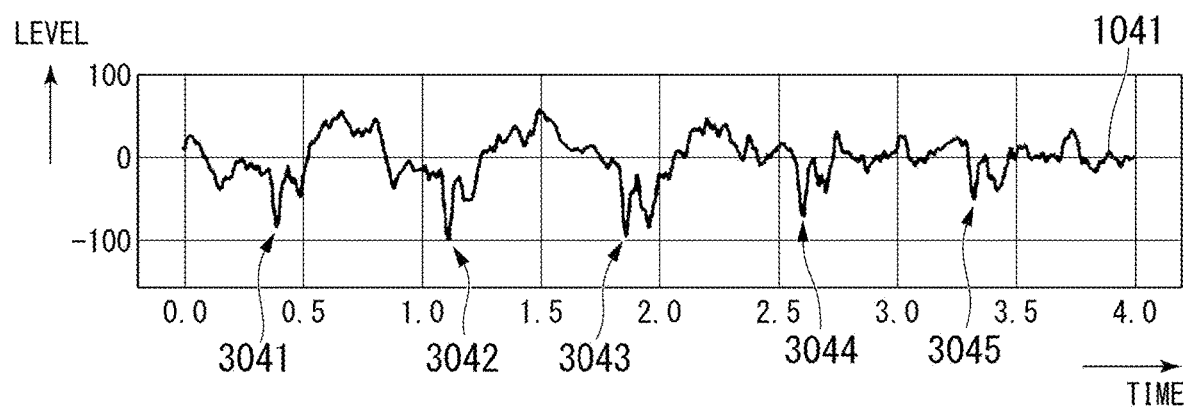
FIG. 6 is a diagram showing an example of a measured signal of a non-attention channel P3 according to the embodiment.

FIG. 6 is a diagram showing an example of a measured signal 1041 of the non-attention channel P3 according to the embodiment.

Figure 7:
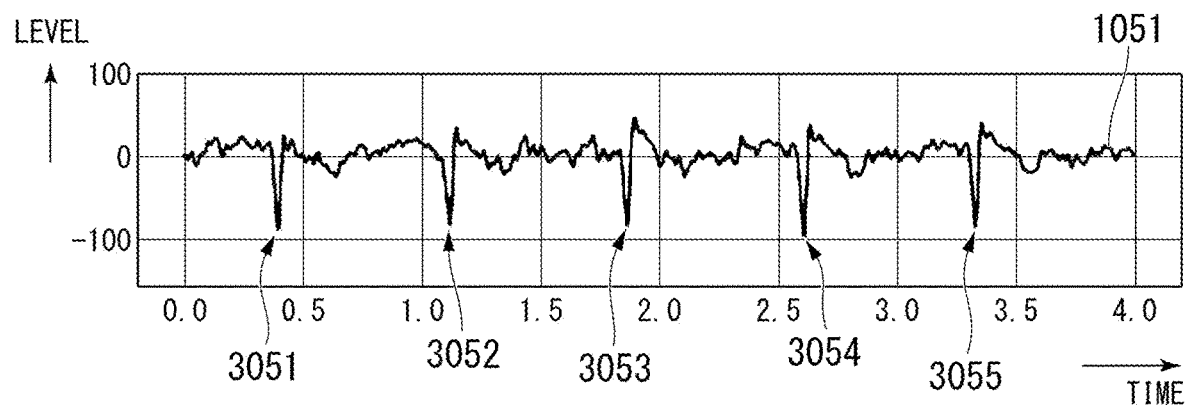
FIG. 7 is a diagram showing an example of a measured signal of a non-attention channel P4 according to the embodiment.

FIG. 7 is a diagram showing an example of a measured signal 1051 of a non-attention channel P4 according to an embodiment.

In the graphs shown in FIGS. 4 to 7, the horizontal axis represents time and the vertical axis represents a level. The level is, for example, the amplitude of the signal and can have positive and negative values.

In the measured signal 1021 of the attention channel P1 shown in FIG. 4, unexpected noise is generated.

Specifically, peak positions 3011 to 3015 that periodically (or substantially periodically) appear in the measured signal 1021 are peak positions of the target signal of interest included in the measured signal 1021.

Also, the measured signal 1021 includes unexpected noise 2021 and unexpected noise 2022.

In the measured signal 1031 of the attention channel P2 shown in FIG. 5, no unexpected noise is generated.

Specifically, peak positions 3031 to 3035 that periodically (or substantially periodically) appear in the measured signal 1031 are peak positions of the target signal of interest included in the measured signal 1031.

In the measured signal 1041 of the attention channel P3 shown in FIG. 6, no unexpected noise is generated.

Specifically, peak positions 3041 to 3045 that periodically (or substantially periodically) appear in the measured signal 1041 are peak positions of the target signal of interest included in the measured signal 1041.

In the measured signal 1051 of the attention channel P4 shown in FIG. 7, no unexpected noise is generated.

Specifically, peak positions 3051 to 3055 that periodically (or substantially periodically) appear in the measured signal 1051 are peak positions of the target signal of interest included in the measured signal 1051.

Here, in the example of FIG. 1, the peaks of the target signal of interest included in the measured signals 1021, 1031, 1041, and 1051 of the channels P1 to P4 are generated when the target object 51 is located near the sensor unit 31.

Every time the target object 51 passes through the position of the sensor unit 31 once, one peak of the target signal of interest is generated.

In the example of FIGS. 4 to 7, the target object 51 passes through the position of the sensor unit 31 five times, and five peaks of the target signal of interest are generated periodically (or substantially periodically).

In the present embodiment, the target signals of interest measured in the plurality of channels P1 to P4 are based on magnetism generated from the same target object 51 and are signals measured by the sensors having different arrangement positions.

Thus, although the target signals of interest measured in the plurality of channels P1 to P4 do not have the same waveform, timings (time positions) at which the peaks of the target signals of interest appear in the plurality of channels P1 to P4 are the same as or close to each other. Also, in the plurality of channels P1 to P4, periods in which the peaks of the target signals of interest appear are the same as or close to each other.

Also, the peaks of the target signals of interest measured in the plurality of channels P1 to P4 may include peaks in which the positive and negative directions are opposite.

<Synthetic Data Generation Process>

The information processing device 11 generates synthetic data that is a result of synthesizing data of measured signals (measurement results) of the three non-attention channels P2 to P4 by the synthetic data generation unit 133.

In the present example, the synthetic data generation unit 133 generates the synthetic data that is the result of synthesizing the data of the measured signals of the three non-attention channels P2 to P4 by regulating a weight of each of the three non-attention channels P2 to P4 in an error least squared approximation process for data of a measured signal of the attention channel P1.

The weight is a weight that contributes to the synthesis (addition). For example, when weights of the non-attention channels P2 to P4 are 0.5, 0.3, and 0.2, a result of multiplying data of the non-attention channel P2 by 0.5, a result of multiplying data of the non-attention channel P3 by 0.3, and a result of multiplying data of the non-attention channel P4 by 0.2 are synthesized.

Here, a linear sum is used as the synthesis in the present example, but other synthesis methods may be used.

Although the case where synthesis is performed so that the synthetic data is closest to the data of the attention channel P1 is shown in the present example, other synthesis methods may be used.

Although the case where the synthesis is performed using the range of all time periods of the measured signal as the range of the time period of data of the measured signal of the attention channel P1 and data of the measured signals of the non-attention channels P2 to P4 is shown in the present example, synthesis may be performed using other ranges. Also, a range of a time period for use in synthesis is, for example, common to all the channels P1 to P4.

Also, a case where the weight of the synthesis is regulated has been shown in the present example, a preset fixed weight may be used when there is no practical hindrance as another example of the configuration or a mode in which the weights of all channels have the same value (a mode in which no weight is used substantially) may be used.

However, because unexpected noise may occur on the positive side and on the negative side in the present embodiment, a weight is required.

Here, a weight value may not necessarily be a positive value, but also a negative value may be used or both positive and negative values may be used.

Figure 8:
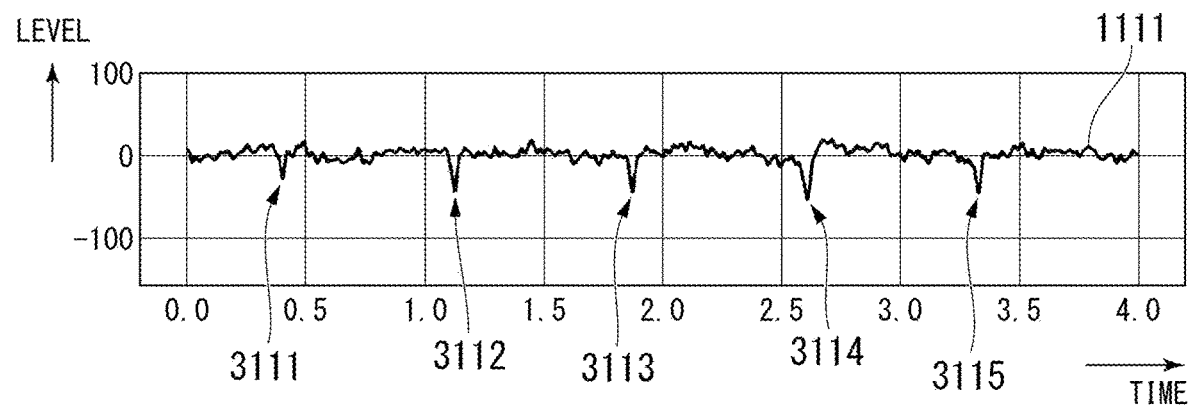
FIG. 8 is a diagram showing an example of a synthetic signal according to the embodiment.

FIG. 8 is a diagram showing an example of a synthetic signal 1111 according to an embodiment.

Here, the synthetic signal 1111 is a signal indicating synthetic data generated by the synthetic data generation unit 133.

In the example of FIG. 8, the synthetic signal 1111 shows five peak positions 3111 to 3115.

<Comparison Between Measured Signal of Attention Channel and Synthetic Signal>

The dissimilarity calculation unit 134 calculates dissimilarity for data of measured signals of the non-attention channels P2 to P4 that are not selected for each prescribed range with respect to data of a measured signal of the attention channel P1. In the present example, the dissimilarity calculation unit 134 calculates dissimilarity for synthetic data as the dissimilarity.

In the present example, a range of a time period having a prescribed time width is used as the prescribed range. A frame representing the prescribed range may be referred to as a window or the like.

Figure 9:
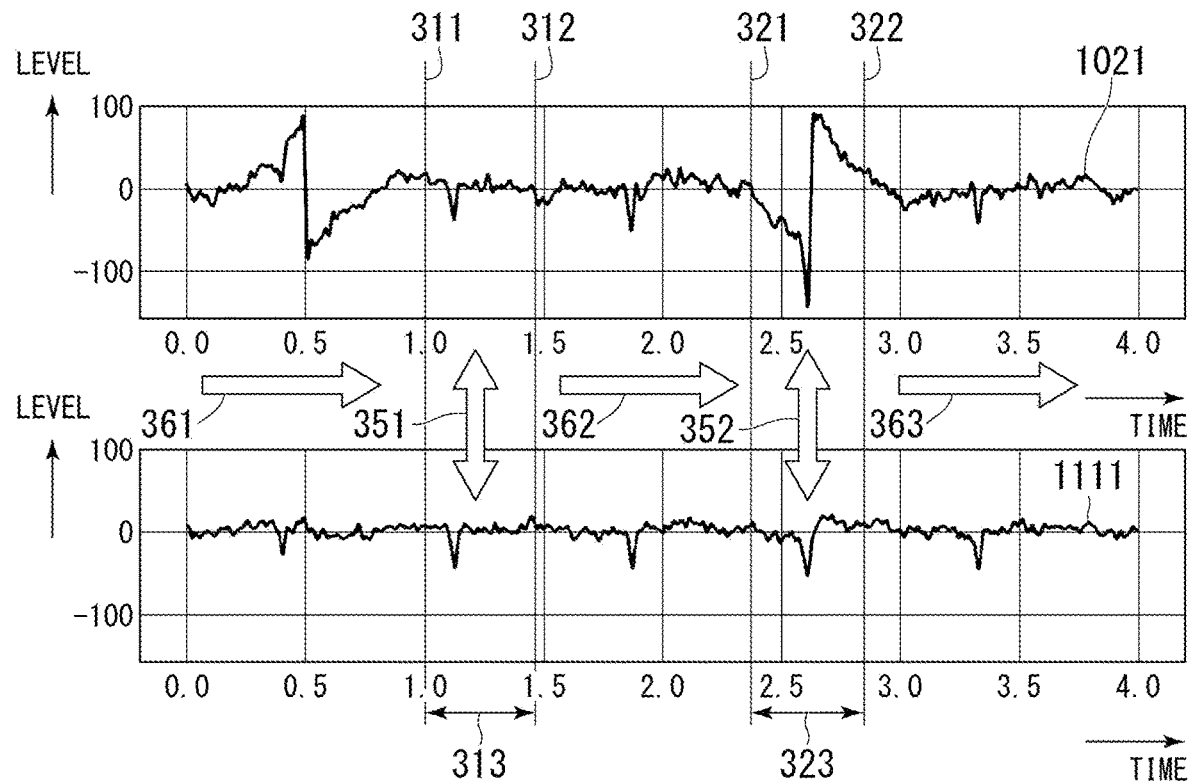
FIG. 9 is a diagram showing a state of a comparison between a measured signal and a synthetic signal of the attention channel P1 according to the embodiment.

FIG. 9 is a diagram showing a state of a comparison between the measured signal 1021 of the attention channel P1 and the synthetic signal 1111 according to the embodiment.

Here, the measured signal 1021 is similar to the measured signal 1021 shown in FIG. 4.

Also, the synthetic signal 1111 is similar to the synthetic signal 1111 shown in FIG. 8.

In the example of FIG. 9, a time axis (a horizontal axis) of the measured signal 1021 and a time axis (a horizontal axis) of the synthetic signal 1111 are aligned.

In FIG. 9, a window 313 representing a range for calculating dissimilarity is shown. The window 313 is a range between a lower limit value 311 and an upper limit value 312 with respect to the time axis (horizontal axis). In the present example, the width of the range is uniform.

Initially, the dissimilarity calculation unit 134 sets a window (not shown) having a certain width with a minimum value of the time axis at which the measured signal 1021 and the synthetic signal 1111 are located as a lower limit value and calculates dissimilarity between a signal part of the measured signal 1021 included in the window and a signal part of the synthetic signal 1111 included in the window.

Subsequently, the dissimilarity calculation unit 134 maintains a uniform width of the window, moves the window in a movement direction 361 (a movement direction 362 and a movement direction 363 are also the same as the movement direction 361) for a prescribed time interval, and calculates the dissimilarity between the signal part of the measured signal 1021 included in the window and the signal part of the synthetic signal 1111 included in the window.

Subsequently, the dissimilarity calculation unit 134 similarly performs window movement and dissimilarity calculation repeatedly.

The dissimilarity calculation unit 134 repeatedly performs the movement of the window and the calculation of the dissimilarity until an upper limit value of the window exceeds a maximum value of the time axis at which the measured signal 1021 and the synthetic signal 1111 are located.

Here, any time interval may be used as the prescribed time interval (time width) for moving the window, for example, a time interval having the same magnitude as the width of the window may be used, or a time interval that is half (=½) of the width of the window may be used.

Also, for example, a time interval for one sample as well as a time interval for a plurality of samples may be used as the prescribed time interval. As an example, a mode in which the time width for one sample is (1/1000) sec when a time width of unexpected noise is assumed to be (1/1000) sec or less may be used.

In the present embodiment, the time interval for one sample corresponds to the time interval of one sample of the measured signal 1021 and is also the same as the time interval of one sample of the synthetic signal 1111.

For example, the windows of adjacent positions may not have overlapping parts or may partially overlap. Also, windows at adjacent positions may be separated from each other.

For example, when the time interval for moving the window is the same as the width of the window, the windows at adjacent positions are in contact with each other.

For example, when the time interval for moving the window is smaller than the width of the window, the windows at adjacent positions partially overlap each other.

For example, when the time interval for moving the window is larger than the width of the window, the windows at adjacent positions are separated from each other.

As an example, in the mode in which the time interval for moving the window is a time interval that is half of the width of the window, the total number of windows can be limited and the overlooking of unexpected noise can be limited.

In the example of FIG. 9, a window 323 corresponds to a window to which the window 313 has been moved. The window 323 is a range between a lower limit value 321 and an upper limit value 322 with respect to the time axis (the horizontal axis).

Also, the windows 313 and 323 illustrate the positions of two windows during movement and the illustrations for windows at other positions are omitted.

A window that is moved in this way may also be referred to as, for example, a sliding window. Also, a time interval at which the window is moved may be referred to as, for example, a step width or the like.

Also, in the example of FIG. 9, the arrow of a comparison 351 schematically indicates that a signal part included in the window 313 is compared between the measured signal 1021 and the synthetic signal 1111.

Likewise, in the example of FIG. 9, the arrow of a comparison 352 schematically indicates that a signal part included in the window 323 is compared between the measured signal 1021 and the synthetic signal 1111.

Although a case where two or more different windows are used has been described in the present example, the width of all time periods in which the measured signal 1021 is located (the widths of all time periods in which the synthetic signal 1111 is located are the same in the present example) may be used as the width of the window as another example of the configuration. In this case, the window is set only once and does not move.

<Dissimilarity Calculation Method>

The dissimilarity calculation unit 134 calculates dissimilarity for each window.

Here, any calculation method may be used as the dissimilarity calculation method.

As an example, a sum of absolute values of differences between the attention channel data and the synthetic data may be used as the dissimilarity in the dissimilarity calculation method. The sum is a sum of absolute values of differences between values corresponding to each other in two pieces of the data. In the present example, the values corresponding to each other are values of the same sample (the same time).

As an example, a sum of squares of the differences between the attention channel data and the synthetic data may be used as the dissimilarity in the dissimilarity calculation method. The sum of the squares is a sum of squares of differences between values corresponding to each other in two pieces of the data. In the present example, the values corresponding to each other are values of the same sample (the same time).

As an example, a maximum value of absolute values of differences between the attention channel data and the synthetic data may be used as the dissimilarity in the dissimilarity calculation method. In the present example, the maximum value is determined from among values per sample (hourly) inside of the window.

As an example, a difference between a feature quantity of attention channel data and a feature quantity of synthetic data may be used as the dissimilarity in the dissimilarity calculation method.

Here, the feature quantity of the data may be calculated on the basis of, for example, waveforms representing the data.

Various feature quantities may be used as feature quantities, for example, means, variance, various higher-order statistics, or a combination of two or more of the statistics may be used.

As an example, a value indicating a difference (a distance) between a probability distribution of the attention channel data and a probability distribution of the synthetic data may be used as the dissimilarity in the dissimilarity calculation method.

Here, the probability distribution of the data is, for example, a probability distribution according to a value of a sample included in a waveform representing the data.

Various probability distributions may be used as the probability distribution. For example, KL divergence, JS divergence, a Pearson distance, a relative Pearson distance, an L2 distance, and the like may be used.

As an example, a difference between a power spectrum of the attention channel data and a power spectrum of the synthetic data may be used as the dissimilarity in the dissimilarity calculation method.

Here, the power spectrum of the data is, for example, the power spectrum of a waveform representing the data.

Also, for example, a power difference at a specific frequency or in a specific frequency band may be used as the difference between the power spectra of two pieces of the data. In this case, the specific frequency may include a plurality of different frequencies and the specific frequency band may include a plurality of different frequency bands.

As an example, a value obtained by an arithmetic equation for causing samples of attention channel data and synthetic data to correspond to each other (a value calculated by the arithmetic equation) may be used as the dissimilarity in the dissimilarity calculation method.

Here, this dissimilarity may be, for example, a value based on a value obtained by a cross-correlation function. Also, because the value obtained by the cross-correlation function is the similarity, for example, a value of the dissimilarity decreases as the value obtained by the cross-correlation function increases.

<Dissimilarity>

Figure 10:
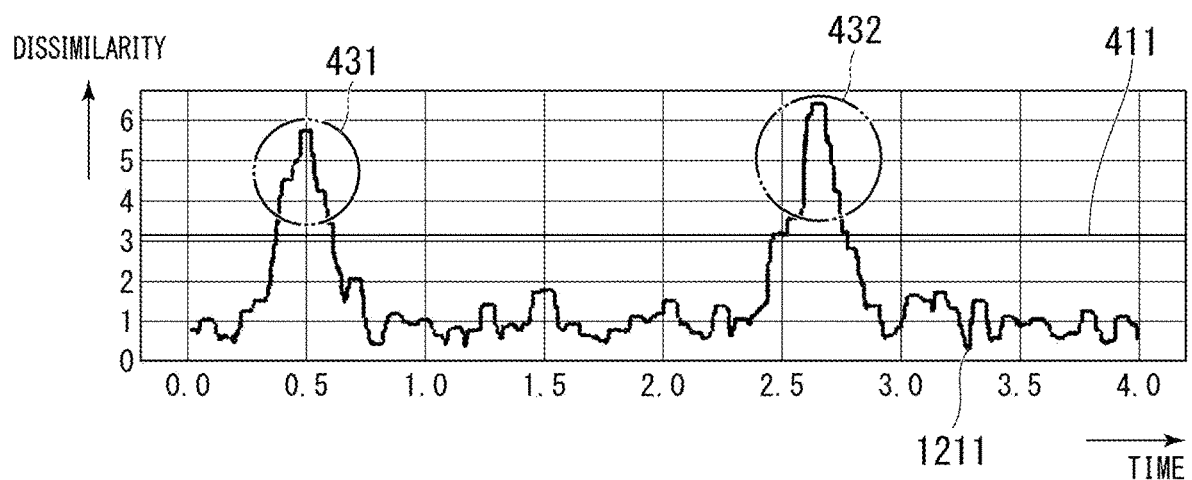
FIG. 10 is a diagram showing an example of dissimilarity according to the embodiment.

FIG. 10 is a diagram showing an example of dissimilarity according to an embodiment.

In the graph shown in FIG. 10, the horizontal axis represents time and the vertical axis represents dissimilarity.

In the present embodiment, a degree of dissimilarity increases as a value of dissimilarity increases.

In FIG. 10, a dissimilarity characteristic 1211, which is a characteristic of dissimilarity for time, and a threshold value 411 related to dissimilarity are shown.

Here, the dissimilarity characteristic 1211 is a characteristic in which the dissimilarity calculated for each time is connected along the time axis.

Also, for example, the threshold value 411 may be preset or a value decided on by the threshold value decision unit 139 may be set as the threshold value 411.

In the example of FIG. 10, schematically, the dissimilarity represented by the dissimilarity characteristic 1211 exceeds the threshold value 411 at positions of times of two positions (in a time period with a width in the example of FIG. 10).

In the example of FIG. 10, these two positions are schematically shown as an unexpected noise part 431 and an unexpected noise part 432.

The dissimilarity determination unit 135 determines whether or not the dissimilarity calculated by the dissimilarity calculation unit 134 is greater than the threshold value 411. In the example of FIG. 10, the dissimilarity determination unit 135 determines that the dissimilarity is greater than the threshold value 411 at the times of the unexpected noise part 431 and the unexpected noise part 432 (in the time period having a width in the example of FIG. 10).

<Method of Deciding on Threshold Value Related to Dissimilarity>

Figure 11:
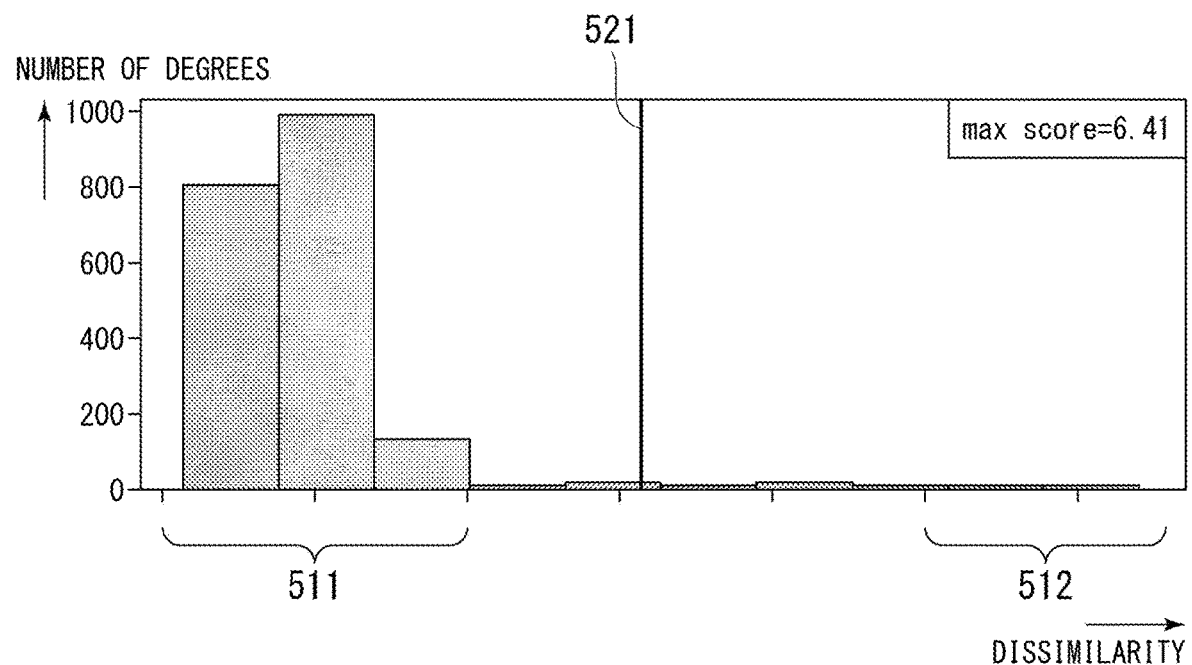
FIG. 11 is a diagram showing an example of a threshold value decision method related to dissimilarity according to the embodiment.

FIG. 11 is a diagram showing an example of a threshold value decision method related to dissimilarity according to an embodiment.

An example of a method in which the threshold value decision unit 139 determines a threshold value related to dissimilarity (the threshold value 411 in the example of FIG. 10) will be described with reference to FIG. 11.

In the graph shown in FIG. 11, the horizontal axis represents dissimilarity and the vertical axis represents the number of degrees. That is, the graph represents a histogram of dissimilarity.

In the example of FIG. 11, there is a portion in which a large number of degrees are concentrated in the lower dissimilarity. In the present example, the portion will be described as a normal noise region 511, which is a normal noise portion. In the present example, normal noise is noise other than unexpected noise, and is noise that is not unexpected, for example, as compared with unexpected noise.

In the example of FIG. 11, there is a portion in which only a very small number of degrees are located in the higher dissimilarity. In the present example, the portion will be described as an unexpected noise region 512, which is a portion of unexpected noise.

The threshold value decision unit 139 decides on a value between the normal noise region 511 and the unexpected noise region 512 as a threshold value 521.

The threshold value decision unit 139 schematically decides on a value of a result of adding a prescribed margin to an upper limit value of dissimilarity when unexpected noise does not appear as the threshold value 521. As the upper limit value, for example, an upper limit value of dissimilarity in the normal noise region 511 may be used.

Here, the range of dissimilarity in which the normal noise region 511 is set is not particularly limited, and, for example, a range in which the number of degrees is greater than a prescribed value may be used.

Also, the range of dissimilarity in which the unexpected noise region 512 is set is not particularly limited, and for example, a range in which the number of degrees is less than a prescribed value may be used.

As an example, the threshold value decision unit 139 may decide on a value obtained by multiplying the dissimilarity of the center of gravity (or the average dissimilarity or the like) of the normal noise region 511 by 3.00 to 3.05 as the threshold value 521. Such a value is a threshold value suitable for detecting unexpected noise by heuristics.

As another example, the threshold value decision unit 139 may decide on the threshold value 521 using various distribution functions, variance, or the like. As the threshold value 521, for example, an outlier based on variance or the like is used.

Thus, the threshold value decision unit 139 decides on the threshold value 521 on the basis of a statistical result of the dissimilarity of each range of data of the attention channel P1 (a time range in the present example).

Here, the range of the window for use in determining the defective range and the range of the window for use in determining the threshold value are the same in the data of the measured signal to simplify description in the present example, but a mode in which these ranges are different may also be used.

<Process Related to Defective Range>

The defective range determination unit 136 determines that the range in which the dissimilarity is determined to be greater than the threshold value is the defective range.

In the present embodiment, for example, the information processing device 11 performs a process of the defective range removal unit 137 or a process of the defective data exclusion unit 138 as a process related to the defective range.

<Defective Range Removal Process>

For the convenience of description, a defective range removal process will be described with reference to FIG. 9.

In the present example, a case where the range of the window 323 shown in FIG. 9 is determined to be a defective range will be described.

The defective range removal unit 137 replaces the data part of the measured signal 1021 of the attention channel P1 in a range determined to be a defective range with the data part of the synthetic signal 1111 in a range that is the same as the range.

In the example of FIG. 9, the defective range removal unit 137 replaces the data part of the measured signal 1021 in the range of the window 323 in which unexpected noise is deemed to have occurred with the data part of the synthetic signal 1111 in the range of the window 323. Thereby, a data part in which it is deemed to have generated unexpected noise is removed from the data of the measured signal 1021 of the attention channel P1.

Here, the range of the window for use in determining the defective range and the range of the data part that is replaced when it is determined to be a defective range are the same in the data of the measured signal to simplify description in the present example, but a mode in which these ranges are different may also be used.

As a specific example, the defective range removal unit 137 may replace the data part of the measured signal 1021 of a range wider than the range of the window 323 in which unexpected noise is deemed to have occurred with the data part of the synthetic signal 1111 of the wider range.

Also, a process performed by the defective range removal unit 137 is effective even if it is performed for data of one measured signal with respect to the attention channel P1. For this reason, in the present embodiment, time-series data having periodic (or substantially periodic) peaks with respect to the target signal of interest is used. However, as another example, it may be applied to time-series data that does not have periodicity with respect to the target signal of interest.

<Process of Excluding Attention Channel Data Including Defective Range>

For the convenience of description, a process of excluding data of a measured signal 1021 of the attention channel P1 including a defective range will be described with reference to FIG. 9.

In the present example, a case where the range of the window 323 shown in FIG. 9 is determined to be a defective range will be described.

In the present example, a case where a plurality of measured signals of the attention channel P1 are acquired is shown. In the present example, a case where a prescribed process is performed on the basis of the plurality of measured signals is shown.

Here, the prescribed process is not particularly limited and may be, for example, a process for an average. The process for the average may be, for example, a process for an additive average.

When the prescribed process based on data of the plurality of measured signals of the attention channel P1 is executed, the defective data exclusion unit 138 excludes data of a measured signal of the attention channel P1 including a range determined to be a defective range. Thereby, the data of the measured signal of the attention channel P1 including the range determined to be the defective range is excluded from the prescribed process and is not used for the prescribed process.

Also, for example, in the field of measurement related to the brain, one event of repetitive events may be referred to as an epoch.

As a specific example, when a process of averaging data of 100 measured signals of the attention channel P1 is performed if it is assumed that no defective range occurs, the processing unit 115 (for example, the defective data exclusion unit 138) may perform a process of averaging data of a total of 99 measured signals of the attention channel P1 when a defective range is generated in data of one of 100 measured signals.

As another specific example, when 100 processes of acquiring measured signals of the attention channel P1 are performed and a process of averaging data of measured signals acquired in the 100 processes is performed if it is assumed that no defective range occurs, the processing unit 115 (for example, the defective data exclusion unit 138) may perform a total of 101 processes of acquiring a measured signal of the attention channel P1 when a defective range is generated in data of one of 100 measured signals and perform a process of averaging data of 100 measured signals.

Also, because the process performed by the defective data exclusion unit 138 is applied when a prescribed process based on data of a plurality of measured signals of the attention channel P1 is executed, the process is suitable for, for example, a case where time-series data having periodic (or substantially periodic) peaks for the target signal of interest is used.

<Spike Noise and Block Noise>

In the information processing device 11 according to the present embodiment, for example, even if the unexpected noise is spike noise or even if the unexpected noise is block noise, unexpected noise can be detected and the influence of unexpected noise can be suppressed.

Figure 12:
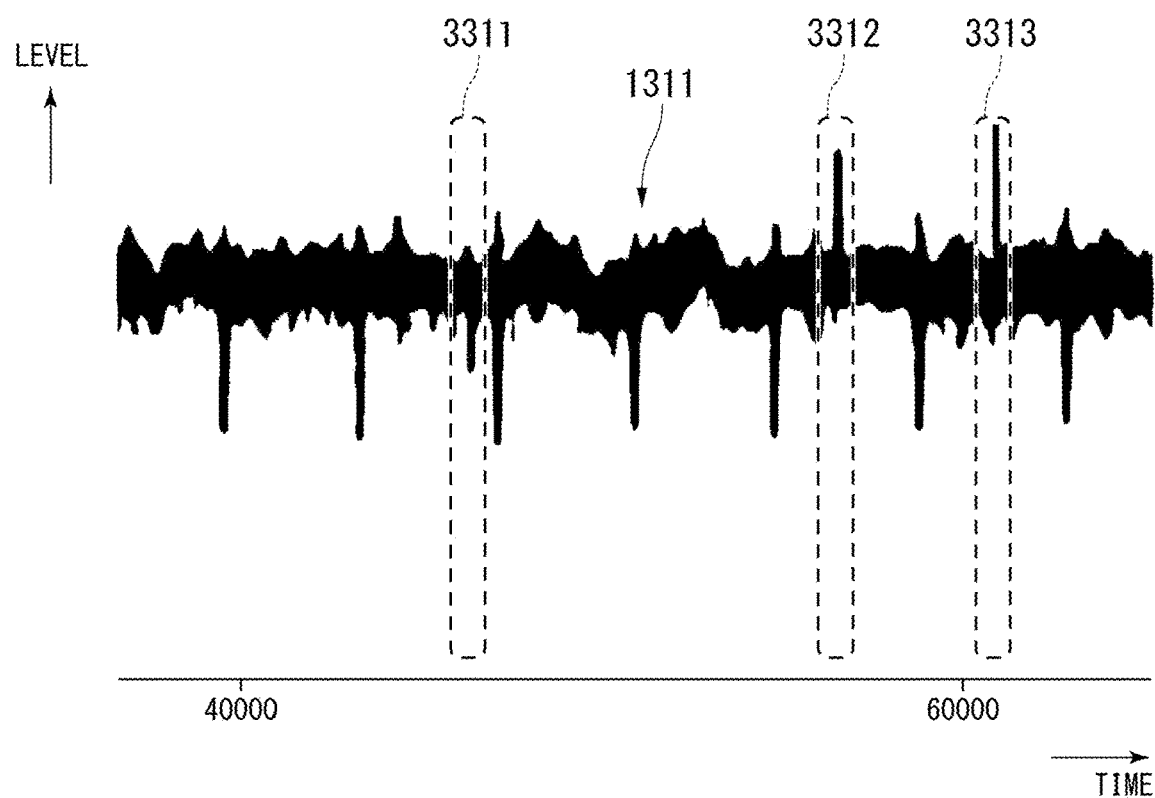
FIG. 12 is a diagram showing an example of spike noise included in the measured signal according to the embodiment.

FIG. 12 is a diagram showing an example of spike noise included in the measured signal according to the embodiment.

In the graph shown in FIG. 12, the horizontal axis represents time and the vertical axis represents a level. The graph is an example for illustrative purposes and does not necessarily show an exact waveform.

In FIG. 12, the measured signal 1311 is shown and spike noise parts 3311 to 3313, which are parts where the spike noise is generated, are schematically shown.

Also, the measured signal 1311 is an example for illustration purposes, and may be regarded as, for example, a measured signal group that includes measured signals of a plurality of channels.

Figure 13:
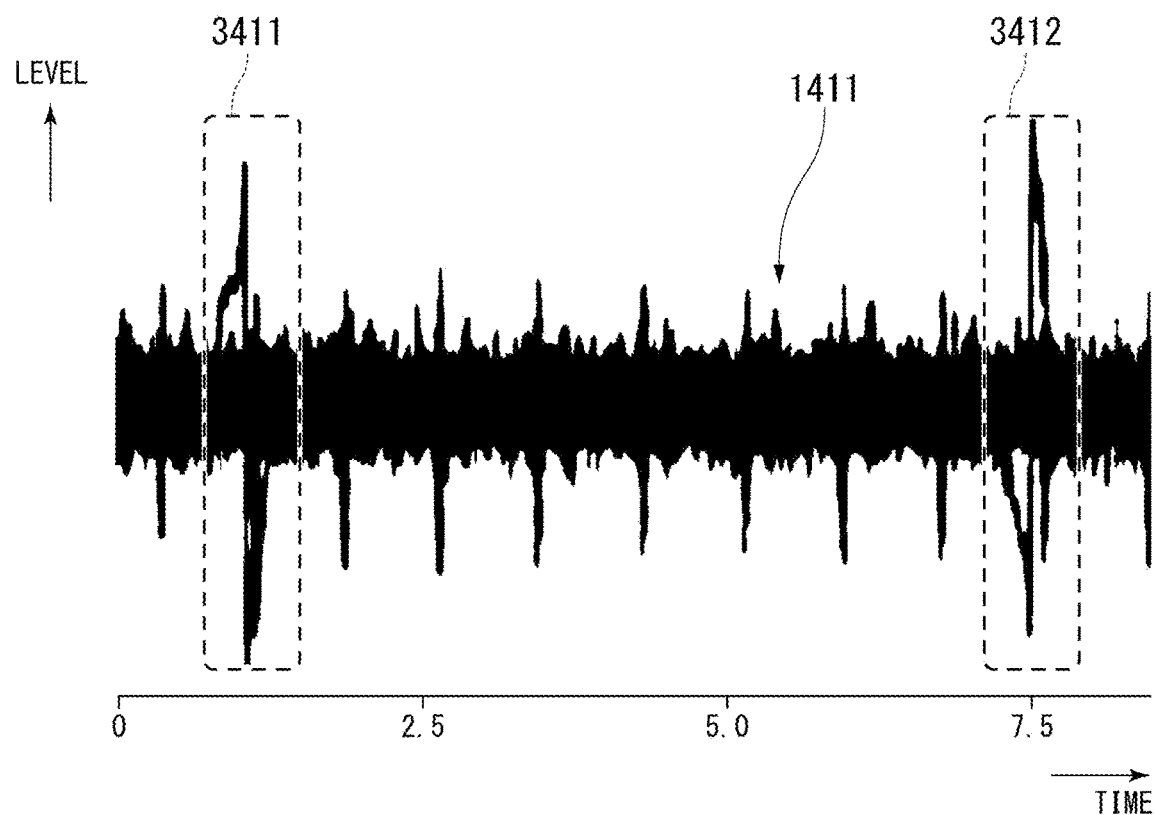
FIG. 13 is a diagram showing an example of block noise included in the measured signal according to the embodiment.

FIG. 13 is a diagram showing an example of block noise included in the measured signal according to the embodiment.

In the graph shown in FIG. 13, the horizontal axis represents time and the vertical axis represents a level. Also, the graph is an example for illustrative purposes and does not necessarily show an exact waveform.

In FIG. 13, a measured signal 1411 is shown and block noise parts 3411 and 3412, which are parts where block noise is generated, are schematically shown.

Also, the measured signal 1411 is an example for illustration purposes, and may be regarded as, for example, a measured signal group that includes measured signals of a plurality of channels.

<Example of Averaging>

An example of an effect obtained in a signal averaging process will be described with reference to FIGS. 14 and 15.

Figure 14:
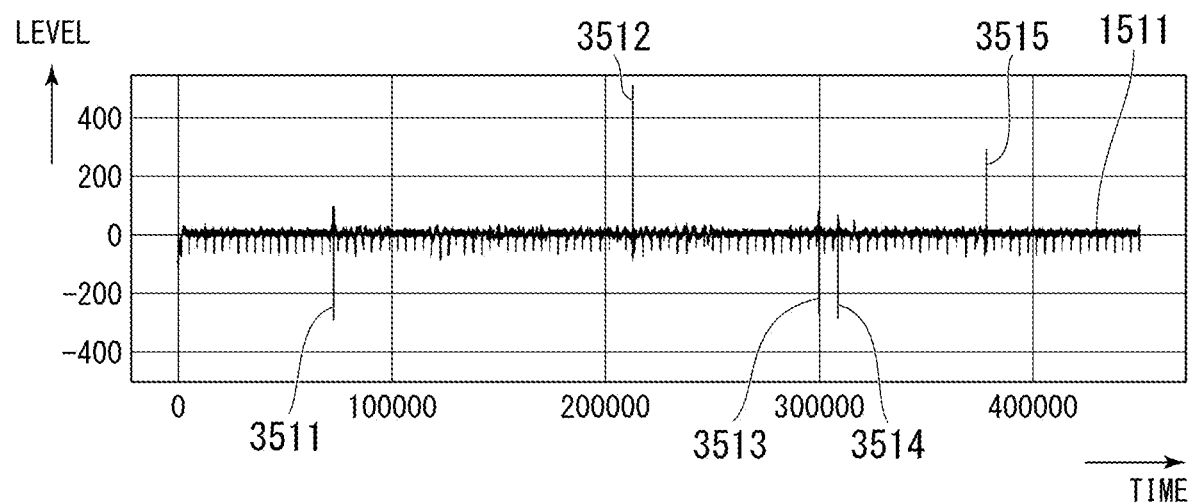
FIG. 14 is a diagram showing an example of an influence of block noise when the measured signal is not averaged according to the embodiment.
Figure 15:
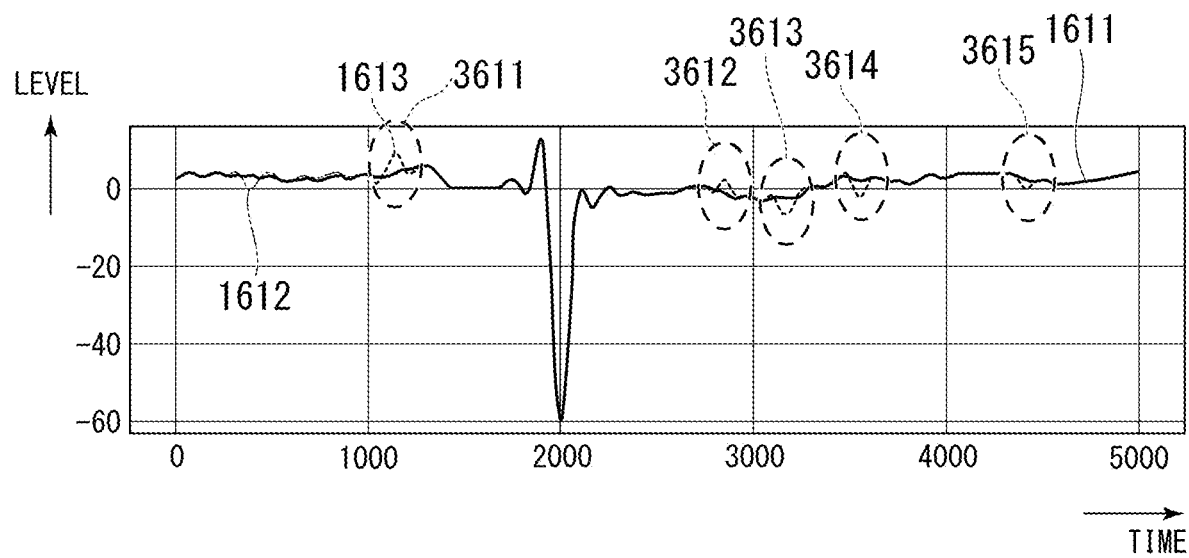
FIG. 15 is a diagram showing an example of the suppression of an influence of block noise when the measured signal is averaged according to the embodiment.

In the graphs shown in FIGS. 14 and 15, the horizontal axis represents time and the vertical axis represents a level. Also, these graphs are examples for illustration purposes and do not necessarily show exact waveforms.

FIG. 14 is a diagram showing an example of the effect of block noise when the measured signal according to the embodiment is not averaged.

In FIG. 14, a measured signal 1511 of one attention channel and block noise 3511 to 3515 generated in the measured signal 1511 are shown.

The measured signal 1511 is one measured signal and a plurality of measured signals are not averaged.

Also, the block noise 3511 to 3515 is shown as an example of unexpected noise in the present example but may be spike noise or the like as another example.

FIG. 15 is a diagram showing an example in which an influence of block noise is suppressed when the measured signal is averaged according to the embodiment.

Also, in the example of FIG. 15, the scale of the horizontal axis (time axis) is different from the example of FIG. 14.

In FIG. 15, an average signal 1611, an average signal 1612 without unexpected noise, and an average signal 1613 with unexpected noise obtained in the process according to the present embodiment are shown.

The average signal 1613 with unexpected noise is a signal obtained by averaging (additive-averaging) a plurality of measured signals for the same attention channel. In this case, at least one measured signal includes unexpected noise (block noise in the present example).

In the present example, artificial block noise is used as the unexpected noise.

The average signal 1612 without unexpected noise is a signal obtained by averaging (additive averaging) a plurality of measured signals for the same attention channel. In this case, measured signals that do not include unexpected noise (block noise in the present example) are used as all measured signals.

The average signal 1611 is a signal of an averaging result obtained by excluding a measured signal (a measured signal including block noise in the present example) that includes a range determined to be a defective range when a plurality of measured signals of the attention channel are averaged by the defective data exclusion unit 138 according to the present embodiment.

In the example of FIG. 15, the average signal 1611 is approximated to a waveform of the average signal 1612 without unexpected noise, and the influence of unexpected noise is more suppressed than the average signal 1613 with unexpected noise. In the example of FIG. 15, parts in which unexpected noise is suppressed are shown as noise parts 3611 to 3615.

[Grid-Shaped Multi-Channel Sensor]

Figure 16:
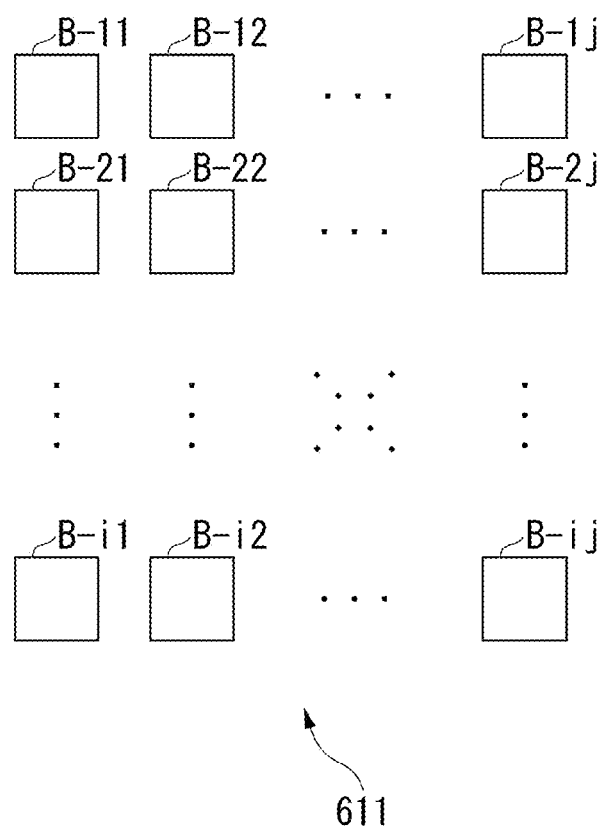
FIG. 16 is a diagram showing an example of a sensor unit having a grid-shaped multi-channel sensor according to a modified example of the embodiment.

FIG. 16 is a diagram showing an example of a sensor unit 611 having a grid-shaped multi-channel sensor according to a modified example of the embodiment.

In FIG. 16, an IJ coordinate system, which is a two-dimensional Cartesian coordinate system, is shown for the convenience of description.

Instead of a grid shape, it may be referred to as a matrix shape or the like.

The sensor unit 611 includes (i×j) sensors B-11 to B-ij. Here, i is an integer greater than or equal to 2 and j is an integer greater than or equal to 2.

Each of the (i×j) sensors B-11 to B-ij corresponds to one channel.

In (i×j) sensors B-11 to B-ij, i sensors are arranged in a direction parallel to an I-axis at first prescribed intervals and j sensors are arranged in a direction parallel to a J-axis at second prescribed intervals.

The first prescribed interval is not particularly limited and may be, for example, an equal interval. The second prescribed interval is not particularly limited and may be, for example, an equal interval.

Also, the first prescribed interval and the second prescribed interval may be, for example, the same interval.

Although a case where a line-shaped sensor unit 31 is used is shown in the example of FIG. 1, a grid-shaped sensor unit 611 may be used as shown in FIG. 16 as another example of the configuration.

In the data of such (i×j) channels, for example, there may be similarity in data of two adjacent channels or there may be similarity in data of two or more adjacent channels.

Also, assuming that i is 1 and j is 2 or more or that i is 2 or more and j is 1, the grid-shaped sensor unit 611 becomes a line-shaped sensor unit.

Also, as another example of the configuration, a sensor unit having a plurality of sensors having various arrangements different from the line shape or the grid shape may be used.

<Channel Data of Spatial Arrangement>

In the example of FIG. 1, a case where time-series data measured by one sensor is used as data for each channel is shown. In this case, a time period range is used as a prescribed range as a window.

Here, a case where data arranged according to the spatial arrangement is used as the data of each channel is shown as another example of the configuration.

A specific example will be described with reference to FIG. 16.

j sensors B-11 to B-1j arranged in the direction parallel to the J-axis are considered.

When measured signals of the j sensors B-11 to B-1j at a certain time (here, values at the time) are arranged according to the arrangement order of these sensors B-11 to B-1j, data arranged according to the spatial arrangement is generated.

Here, even if an axis in a spatial direction (an axis in a direction parallel to the J-axis in the present example) is used instead of the time axis in the example of FIG. 1, data serving as an alternative to the time-series data in the example of FIG. 1 can be obtained.

Thus, instead of the time-series data in the example of FIG. 1, data arranged according to the spatial arrangement may be used. In this case, a spatial range is used as a prescribed range serving as a window instead of the time period range.

For example, assuming that data arranged according to the spatial arrangement of the j sensors B-11 to B-1j in a first array in the direction parallel to the I-axis is set as data of one channel, data arranged according to the spatial arrangement of the j sensors B-21 to B-2j in a second array in the direction parallel to the I-axis is set as data of another channel, and the same is also true for subsequent data, the data of the i channels is obtained.

In the data of such i channels, for example, there may be similarity in the data of two adjacent channels or there may be similarity in the data of two or more adjacent channels.

Here, for j sensors (for example, sensors B-11 to B-1j and the like) arranged in the direction parallel to the J-axis, when the measured signals of j sensors at a certain time (here, values at the time) are arranged according to the arrangement order of these j sensors, the values may become periodic in this arrangement direction. In other words, data arranged according to the spatial arrangement may be periodic data.

Also, in the data arranged according to the spatial arrangement, such periodicity may be present or absent.

Here, an example of data arranged according to a spatial arrangement in the direction parallel to the J-axis has been shown, but data arranged according to the spatial arrangement in the direction parallel to the I-axis may be used, or data arranged according to a spatial arrangement in another direction (for example, a direction oblique to the I-axis and the J-axis) may be used, as another example.

For example, an image sensor using a charged coupled device (CCD) or a complementary metal-oxide-semiconductor (CMOS) may be used as each of the sensors B-11 to B-ij. Each of the sensors B-11 to B-ij may be used as a sensor for measuring a single pixel signal.

For example, when there are longitudinal and horizontal directions (in the example of FIG. 16, for example, a direction parallel to the I-axis and a direction parallel to the J-axis), a group of a plurality of linear sensors in the longitudinal or horizontal direction may be used as a sensor group for one channel. In this case, for example, a process as in the present embodiment (a process such as the determination of a range of unexpected noise) may be performed for two channels adjacent to the attention channel (for example, adjacent channels in the upward/downward direction or adjacent channels in the left/right direction) or a process as in the present embodiment may be performed for any number of channels (which may be all channels) adjacent to the attention channel (for example, channels whose positions are shifted in the upward and downward directions or channels whose positions are shifted in the left and right directions).

[Regarding Plurality of Sensors]

A plurality of sensors for measuring signals of a plurality of channels may be arranged in any form.

For example, sensors (or a sensor group) for the channels may be arranged at a close position (a position at a short separation distance) in a space or may be arranged at a distant position (a position at a long separation distance) in a space.

For example, the plurality of sensors may measure signals generated from the same signal source. In the present embodiment, the measured signals of the plurality of channels are similar (correlated) to each other. For example, the waveforms of measured signals of a plurality of channels are mostly similar. The similarity between the waveforms may be, for example, similarity between waveforms having different levels.

As a specific example, there may be a case where, for optical signals generated from the same signal source, a sensor arranged at a prescribed directional side (e.g., an east side or the like) with respect to the signal source and a sensor arranged at another directional side (e.g., a west side, a south side, a north side, or the like) with respect to the signal source measure signals similar to each other.

In the measured signals of the plurality of channels, unexpected noise occurs due to an individual situation of each channel.

Unexpected noise generated in the measured signal of one channel does not affect the measured signal of another channel. For this reason, the measured signal of one channel in which unexpected noise is generated acts differently from the measured signals of the other channels due to the influence of the unexpected noise.

Although the case where unexpected noise is generated in a measured signal of one channel among the plurality of channels has been described to simplify the description in the present embodiment, unexpected noise may be generated simultaneously (or substantially simultaneously) in the measured signals of two or more channels incidentally.

In the present embodiment, the plurality of sensors are arranged at different positions and are expected to acquire different information (measurement results). That is, in the present embodiment, the plurality of sensors are not considered as redundant sensors. The measured signal of each channel is a measured signal at another position in a space and is not completely redundant and not completely independent.

However, redundant sensors expected to acquire exactly the same information (measured signal) by two or more sensors may be used as the plurality of sensors as another example of the configuration.

[Channel for Use in Process Such as Determination of Range of Unexpected Noise]

When one channel of the plurality of channels is used as an attention channel, for example, a process as in the present embodiment (a process such as the determination of the range of unexpected noise) may be performed using all other channels or a process as in the present embodiment may be performed using some other channels.

In this way, when a process as in the present embodiment is performed using some other channels, for example, another channel having high similarity (low dissimilarity) with respect to the attention channel may be preferentially used.

Also, in the present embodiment, after a process such as the determination of the range of unexpected noise using a certain channel as an attention channel is performed, a similar process is performed using each of the plurality of channels as the attention channel sequentially as in the case where a similar process is performed using another channel as the attention channel. In this case, for example, for a channel that has already been determined to have a defective range, a mode in which data of the measured signal from which the defective range has been removed by the defective range removal unit 137 is used may be used or a mode in which the processing unit 115 (in which, for example, the function of the defective data exclusion unit 138 may be used) removes a channel determined to have a defective range and does not use the removed channel in a subsequent process may be used.

Also, a mode in which a similar process is performed using each of the plurality of channels as an attention channel sequentially may not necessarily be used. As another example, a mode in which a similar process is performed using each of some two or more channels of the plurality of channels as an attention channel sequentially may be used or a mode in which a process is performed using one channel of the plurality of channels as an attention channel may be used.

[Regarding Measured Signals]

The process may be applied to various signals as a signal measured by the sensor (a measured signal).

For example, the process according to the present embodiment may be applied to a signal related to a living body (a biological signal).

The biological signal may be, for example, a biological electrical signal or a biological magnetic signal.

As a specific example, the biological signal may be a measured signal of a magnetic field due to the human heart. For example, it is possible to obtain information such as a contour line of the magnetic field using measured signals from a plurality of MR sensors arranged on the front (ventral side) or side (arm side) of the human heart or the like. Also, for example, in a signal obtained by measuring the heartbeat, a peak due to the heartbeat periodically (or substantially periodically) appears as a target signal of interest.

Although an example of a configuration in which the target object 51 is moved by the belt conveyor 21 is shown in the example of FIG. 1, the movement of the target object 51 may be performed by a device other than the belt conveyor 21.

Although a case where relative positions of the target object 51 and the sensor unit 31 change as the target object 51 moves is shown in the example of FIG. 1, the sensor unit 31 may be moved (for example, rotated or the like) instead of the target object 51, or both the target object 51 and the sensor unit 31 may be moved, as another example of the configuration.

Also, the target object of signal measurement may not necessarily move during measurement and, for example, a target object fixed at a prescribed position (a certain position) may be used.

As the target object of signal measurement, for example, a target object that generates a signal periodically or approximately periodically may be used. The signal may be, for example, a current signal, a magnetic field signal, a sound signal, or a vibration signal. For example, near-periodic timings may be used as approximate periodic timings.

As a specific example, in a system for monitoring an operation of a pump that is the target object of signal measurement, a signal such as vibration generated periodically or approximately periodically by the operation of the pump may be used as a measurement target signal.

Here, an example in which the target object of signal measurement and the multi-channel sensor are arranged at a fixed position (a certain position) is shown using FIG. 16.

In the present example, the sensor unit 611 having a grid-shaped multi-channel sensor shown in FIG. 16 is arranged at a fixed position (a certain position).

Also, in the present example, the target object of signal measurement (not shown in FIG. 16) is arranged at any fixed position (a certain position) with respect to the sensor unit 611.

In this case, when a periodic or approximate periodic signal due to the target object is measured by the sensor unit 611, a periodic or approximate periodic signal waveform can be measured, for example, as shown in FIGS. 4 to 7.

Here, the case where the sensor unit 611 having a grid-shaped multi-channel sensor is used as the sensor unit arranged at a fixed position has been described. As the sensor unit 611, for example, a line-shaped sensor unit may be used when i is 1 and j is 2 or more or when i is 2 or more and j is 1. Also, as the sensor unit arranged at a fixed position, a sensor unit having a plurality of sensors having various arrangements different from a line shape or a grid shape may be used.

Although the case where measurement (signal measurement) by the sensor unit 31 is performed in a situation where the target object 51 is moved by the belt conveyor 21 has been described in the example of FIG. 1, for example, measurement (signal measurement) by the sensor unit 31 may be performed in a situation where the belt conveyor 21 is stopped. In this case, when the target object 51 that generates a periodic or approximate periodic signal is used, for example, a periodic or approximate periodic signal waveform as shown in FIGS. 4 to 7 can be measured by the sensor unit 31.

Also, a configuration in which the target object 51 is arranged at any fixed position (a certain position) in a state in which no belt conveyor 21 is provided may be used in the example of FIG. 1. In this case, when the target object 51 that generates a periodic or approximate periodic signal is used, for example, a periodic or approximate periodic signal waveform as shown in FIGS. 4 to 7 can be measured by the sensor unit 31.

As described above, in the information processing system 1 according to the present embodiment, unexpected noise included in a target signal (a measured signal in the present embodiment) can be accurately detected in the information processing device 11.

The information processing device 11 according to the present embodiment detects unexpected noise included in the data of the attention channel on the basis of dissimilarity in data of two or more channels other than the attention channel with respect to the data of the attention channel serving as an inspection target.

Therefore, in the information processing device 11, even if the target signal of interest and unexpected noise overlap the data of the attention channel, it is possible to detect the presence of unexpected noise by suppressing the influence of the target signal of interest.

In the information processing device 11 according to the present embodiment, for example, even if the target signal of interest included across the data of a plurality of channels overlaps the unexpected noise specific to the attention channel to be removed, it is possible to detect unexpected noise included in the data of the attention channel.

In the information processing device 11 according to the present embodiment, for example, even if the amplitude of the unexpected noise is substantially the same as the amplitude of the target signal of interest, the influence of the target signal of interest can be suppressed and the presence of unexpected noise can be detected.

In the information processing device 11 according to the present embodiment, it is possible to detect the time (or the time period) when the unexpected noise occurred with respect to unexpected noise that unexpectedly occurs inherently in an attention channel.

When the presence or absence of unexpected noise included in the data is determined for each channel, it is difficult to suitably determine (separate) the target signal of interest and the unexpected noise. For example, because unexpected noise is rarely generated, the influence of unexpected noise is weakened in a method of evaluating each channel using a statistical value such as variance and it is difficult to determine the presence or absence of unexpected noise.

In the information processing device 11 according to the present embodiment, for example, it is not necessary to prepare a simulated waveform of unexpected noise in advance, a process such as prior measurement is not required, and unexpected noise detection can be simplified. In the present embodiment, it can be applied to a wide range of signals as a target signal for detecting unexpected noise.

In the information processing device 11 according to the present embodiment, data serving as the comparison target for determining dissimilarity associated with data of an attention channel is generated by adaptively synthesizing data of two or more other channels, so that a suitable comparison target can be generated.

Attempts for describing the behavior of the data of the attention channel to the maximum extent possible by a result of weighted synthesis of data of two or more channels other than the attention channel (synthetic data) in the information processing device 11 according to the present embodiment have been made and it is possible to identify a difference part that could not be described as a dissimilar part between the data of the attention channel and the data of other channels.

Therefore, the information processing device 11 can determine a part of unexpected noise unique to the attention channel as a dissimilar part without determining the target signal of interest in common with the data of other channels as a dissimilar part with respect to the data of the attention channel.

Here, the information processing device 11 can improve the accuracy of detection of unexpected noise by performing a weighted synthesis process for the data of two or more channels other than the attention channel, for example, as compared with a case where a simple addition or subtraction operation is performed on the data of two or more channels other than the attention channel.

Also, when the data of the attention channel and the weighted synthetic data are approximated, an error least squares approximation process or the like in which calculation is easy may be used.

In the information processing device 11 according to the present embodiment, for example, a calculation method suitable for a type (characteristics) of unexpected noise generated in data of a plurality of channels and the like may be used as a dissimilarity calculation method.

As an example, when a value corresponding to a sum of absolute values of differences between the data of the attention channel and the synthetic data is used as the dissimilarity, especially when the unexpected noise is blocky, it is easy to effectively reflect the amplitude of the unexpected noise in the dissimilarity.

As an example, when a value corresponding to a sum of squares of the differences between the data of the attention channel and the synthetic data is used as the dissimilarity, especially when the unexpected noise is Gaussian-like, it is easy to effectively reflect the amplitude of the unexpected noise in the dissimilarity.

As an example, when a value corresponding to a maximum value of absolute values of the differences between the attention channel data and the synthetic data is used as the dissimilarity, especially when the unexpected noise is spike-shaped, it is easy to effectively reflect the amplitude of the unexpected noise in the dissimilarity. In such a dissimilarity, for example, it is easy to directly reflect a level of unexpected noise (a spike level).

In the information processing device 11 according to the present embodiment, when there is a defective range in the data of the attention channel, it is possible to replace only the defective range with a data part based on data of another channel.

Therefore, in the information processing device 11, even if there is a defective range in the data of the attention channel, it is possible to use a data part other than the defective range instead of discarding the entire data of the attention channel. Here, when a defective range occurs due to unexpected noise, the data part other than the defective range is a normal data part, which is in a large range compared to the overall data in many cases.

Thus, in the information processing device 11, for example, the missing data generated for the channel or time period (or spatial range) is reduced and the data of the attention channel cleaned by removing the data part of the defective range can be used for a subsequent process and the like.

In the information processing device 11 according to the present embodiment, when there is a defective range in attention channel data, it is possible to discard the entire attention channel data.

Therefore, for example, when a plurality of pieces of data are measured for the same attention channel, it is possible to remove data having a defective range and perform various types of processes using clean data.

In the information processing device 11 according to the present embodiment, it is possible to set a threshold value for use in determining dissimilarity for attention channel data on the basis of data of a plurality of channels.

Therefore, in the information processing device 11, for example, it is possible to detect unexpected noise unique to the attention channel data without being affected by a steady noise environment in the sensor of the attention channel, the characteristics of the target signal, or the like.

In the information processing device 11 according to the present embodiment, the width of the window for detecting unexpected noise generated in the attention channel data can be set to the width of one sample.

Therefore, the information processing device 11 can effectively detect unexpected noise having a narrow generation time range and can accurately identify a generation time period (a generation time point) of unexpected noise.

<Examples of Configurations According to Above Embodiments>

As an example of a configuration, a program (the program executed by the processor in the information processing device 11 in the present embodiment) is a program for causing a computer to implement an acquisition function (a function of the acquisition unit 131 in the example of FIG. 2) of acquiring data of a plurality of channels that are three or more channels; a selection function (a function of the selection unit 132 in the example of FIG. 2) of selecting data of a single channel as attention channel data from the data of the plurality of channels acquired in the acquisition function; and a dissimilarity calculation function (a function of the dissimilarity calculation unit 134 in the example of FIG. 2) of calculating dissimilarity for data of two or more channels within data of channels not selected in the selection function in each prescribed range of the attention channel data with respect to the attention channel data selected in the selection function.

As an example of the configuration, the program causes the computer to further implement a synthetic data generation function (a function of the synthetic data generation unit 133 in the example of FIG. 2) of generating synthetic data that is a result of synthesizing the data of the two or more channels within the data of the channels not selected in the selection function.

The dissimilarity calculation function is configured to calculate the dissimilarity for the synthetic data generated in the synthetic data generation function.

As an example of the configuration, in the program, the synthetic data generation function is configured to generate the synthetic data by regulating a weight for synthesizing the data of the two or more channels within the data of the channels not selected in the selection function in an error least squares approximation process for the attention channel data.

As an example of the configuration, in the program, the dissimilarity calculation function is configured to calculate the dissimilarity based on a sum of absolute values of differences between the attention channel data and the synthetic data.

As an example of the configuration, in the program, the dissimilarity calculation function is configured to calculate the dissimilarity based on a sum of squares of differences between the attention channel data and the synthetic data.

As an example of the configuration, in the program, the dissimilarity calculation function is configured to calculate the dissimilarity based on a maximum value of absolute values of differences between the attention channel data and the synthetic data.

As an example of the configuration, in the program, the dissimilarity calculation function is configured to calculate the dissimilarity based on a difference between a feature quantity of the attention channel data and a feature quantity of the synthetic data.

As an example of the configuration, in the program, the dissimilarity calculation function is configured to calculate the dissimilarity based on a difference between a probability distribution of the attention channel data and a probability distribution of the synthetic data.

As an example of the configuration, in the program, the dissimilarity calculation function is configured to calculate the dissimilarity based on a difference between a power spectrum of the attention channel data and a power spectrum of the synthetic data.

As an example of the configuration, in the program, the dissimilarity calculation function is configured to calculate the dissimilarity using an arithmetic equation for causing samples of the attention channel data and the synthetic data to correspond to each other.

As an example of the configuration, the program causes the computer to further implement a dissimilarity determination function (a function of the dissimilarity determination unit 135 in the example of FIG. 2) of determining whether or not the dissimilarity calculated in the dissimilarity calculation function is greater than a prescribed threshold value; and a defective range determination function (a function of the defective range determination unit 136 in the example of FIG. 2) of determining the prescribed range in which it is determined that the dissimilarity is greater than the prescribed threshold value in the dissimilarity determination function as a defective range.

As an example of the configuration, the program causes the computer to further implement a defective range removal function (a function of the defective range removal unit 137 in the example of FIG. 2) of replacing a data part of the prescribed range determined to be the defective range in the defective range determination function with a data part of a result of synthesizing the data of the two or more channels within the data of the channels not selected in the selection function.

As an example of the configuration, the program causes the computer to further implement a defective data exclusion function (a function of the defective data exclusion unit 138 in the example of FIG. 2) of excluding the attention channel data including the prescribed range determined to be the defective range in the defective range determination function when a prescribed process based on a plurality of pieces of the attention channel data is executed.

As an example of the configuration, the program causes the computer to further implement a threshold value decision function (a function of the threshold value decision unit 139 in the example of FIG. 2) of deciding on the threshold value on the basis of a statistical result of the dissimilarity of each range of the attention channel data using the dissimilarity obtained for each range that is the same as or different from the prescribed range.

As an example of the configuration, in the program, the prescribed range includes two or more different ranges.

As an example of the configuration, in the program, the prescribed range is a range for one sample of the attention channel data.

As an example of the configuration, in the program, the data of the plurality of channels is time-series data. The prescribed range is a time period range.

As an example of the configuration, in the program, the data of the plurality of channels is data arranged according to a spatial arrangement. The prescribed range is a spatial range.

For example, an information processing device can be provided.

As an example of a configuration, the information processing device (the information processing device 11 in the example of FIG. 1) includes an acquisition unit (the acquisition unit 131 in the example of FIG. 2) configured to acquire data of a plurality of channels that are three or more channels; a selection unit (the selection unit 132 in the example of FIG. 2) configured to select data of a single channel as attention channel data from the data of the plurality of channels acquired by the acquisition unit;

and a dissimilarity calculation unit (the dissimilarity calculation unit 134 in the example of FIG. 2) configured to calculate dissimilarity for data of two or more channels within data of channels not selected by the selection unit in each prescribed range of the attention channel data with respect to the attention channel data selected by the selection unit.

For example, an information processing method can be provided.

As an example of a configuration, the information processing method (the method performed in the information processing device 11 in the example of FIG. 1) includes acquiring, by an acquisition unit of an information processing device, data of a plurality of channels that are three or more channels; selecting, by a selection unit of the information processing device, data of a single channel as attention channel data from the data of the plurality of channels acquired by the acquisition unit; and calculating, by a dissimilarity calculation unit of the information processing device, dissimilarity for data of two or more channels within data of channels not selected by the selection unit in each prescribed range of the attention channel data with respect to the attention channel data selected by the selection unit.

For example, an information processing system can also be provided.

As an example of a configuration, the information processing system (the information processing system 1 in the example of FIG. 1) includes a sensor unit (the sensor unit 31 in the example of FIG. 1) configured to measure data of a plurality of channels that are three or more channels and an information processing device (the information processing device 11 in the example of FIG. 1).

The information processing device includes an acquisition unit configured to acquire data of a plurality of channels that are three or more channels; a selection unit configured to select data of a single channel as attention channel data from the data of the plurality of channels acquired by the acquisition unit; and a dissimilarity calculation unit configured to calculate dissimilarity for data of two or more channels within data of channels not selected by the selection unit in each prescribed range of the attention channel data with respect to the attention channel data selected by the selection unit.

Also, a program for implementing the function of any component of any device described above may be recorded on a computer-readable recording medium and the program may be read and executed by a computer system. Also, the "computer system" used here may include an operating system (OS) or hardware such as peripheral devices. Also, the "computer-readable recording medium" refers to a storage device such as a flexible disc, a magneto-optical disc, a read-only memory (ROM), a portable medium such as a compact disc-ROM (CD-ROM), and a hard disk embedded in the computer system. Furthermore, the "computer-readable recording medium" is assumed to include a medium that holds a program for a constant period of time, such as a volatile memory inside a computer system serving as a server or a client when the program is transmitted via a network such as the Internet or a communication circuit such as a telephone circuit. For example, the volatile memory may be a random-access memory (RAM). For example, the recording medium may be a non-transitory recording medium.

Also, the above-described program may be transmitted from a computer system storing the program in a storage device or the like to another computer system via a transmission medium or by transmission waves in a transmission medium. Here, the "transmission medium" for transmitting the program refers to a medium having a function of transmitting information, as in a network such as the Internet or a communication circuit such as a telephone circuit.

Also, the above-described program may be a program for implementing some of the above-described functions. Also, the above-described program may be a so-called differential file capable of implementing the above-described function in combination with a program already recorded on the computer system. The differential file may be referred to as a differential program.

Also, the function of any component of any device described above may be implemented by a processor. For example, each process in the embodiment may be implemented by a processor that operates on the basis of information of a program or the like and a computer-readable recording medium that stores information of a program or the like. Here, in the processor, for example, the function of each part may be implemented by individual hardware or the function of each part may be implemented by integrated hardware. For example, the processor may include hardware and the hardware may include at least one of a circuit that processes a digital signal and a circuit that processes an analog signal. For example, the processor may be configured using one or more circuit devices or/and one or more circuit elements mounted on a circuit board. An integrated circuit (IC) or the like may be used as the circuit device and a resistor, a capacitor, or the like may be used as the circuit element.

Here, the processor may be, for example, a CPU. However, the processor is not limited to the CPU and, for example, various types of processors such as a graphics processing unit (GPU) or a digital signal processor (DSP) may be used. Also, for example, the processor may be a hardware circuit based on an application specific integrated circuit (ASIC). Also, the processor may include, for example, a plurality of CPUs, or may include a hardware circuit of a plurality of ASICs. Also, the processor may include, for example, a combination of a plurality of CPUs and a hardware circuit including a plurality of ASICs. Also, the processor may include, for example, one or more of an amplifier circuit and a filter circuit for processing an analog signal and the like.

Although embodiments of the present disclosure have been described in detail above with reference to the drawings, specific configurations are not limited to the embodiments and other designs and the like may also be included without departing from the scope of the present disclosure.

<Configuration 1>

A non-transitory computer readable storage medium storing a program for causing a computer to implement:
- an acquisition function of acquiring data of a plurality of channels that are three or more channels;
- a selection function of selecting data of a single channel as attention channel data from the data of the plurality of channels acquired in the acquisition function; and
- a dissimilarity calculation function of calculating dissimilarity for data of two or more channels within data of channels not selected in the selection function in each prescribed range of the attention channel data with respect to the attention channel data selected in the selection function.

<Configuration 2>

The non-transitory computer readable storage medium according to <configuration 1>,
- wherein the program causes the computer to further implement a synthetic data generation function of generating synthetic data that is a result of synthesizing the data of the two or more channels within the data of the channels not selected in the selection function, and
- wherein the dissimilarity for the synthetic data generated in the synthetic data generation function is calculated in the dissimilarity calculation function.

<Configuration 3>

The non-transitory computer readable storage medium according to <configuration 2>, wherein the synthetic data is generated by regulating a weight for synthesizing the data of the two or more channels within the data of the channels not selected in the selection function in an error least squares approximation process for the attention channel data in the synthetic data generation function.

<Configuration 4>

The non-transitory computer readable storage medium according to <configuration 2> or <configuration 3>, wherein the dissimilarity based on a sum of absolute values of differences between the attention channel data and the synthetic data is calculated in the dissimilarity calculation function.

<Configuration 5>

The non-transitory computer readable storage medium according to <configuration 2> or <configuration 3>, wherein the dissimilarity based on a sum of squares of differences between the attention channel data and the synthetic data is calculated in the dissimilarity calculation function.

<Configuration 6>

The non-transitory computer readable storage medium according to <configuration 2> or <configuration 3>, wherein the dissimilarity based on a maximum value of absolute values of differences between the attention channel data and the synthetic data is calculated in the dissimilarity calculation function.

<Configuration 7>

The non-transitory computer readable storage medium according to <configuration 2> or <configuration 3>, wherein the dissimilarity based on a difference between a feature quantity of the attention channel data and a feature quantity of the synthetic data is calculated in the dissimilarity calculation function.

<Configuration 8>

The non-transitory computer readable storage medium according to <configuration 2> or <configuration 3>, wherein the dissimilarity based on a difference between a probability distribution of the attention channel data and a probability distribution of the synthetic data is calculated in the dissimilarity calculation function.

<Configuration 9>

The non-transitory computer readable storage medium according to claim <configuration 2> or <configuration 3>, wherein the dissimilarity based on a difference between a power spectrum of the attention channel data and a power spectrum of the synthetic data is calculated in the dissimilarity calculation function.

<Configuration 10>

The non-transitory computer readable storage medium according to <configuration 2> or <configuration 3>, wherein the dissimilarity using an arithmetic equation for causing samples of the attention channel data and the synthetic data to correspond to each other is calculated in the dissimilarity calculation function.

<Configuration 11>

The non-transitory computer readable storage medium according to any one of <configuration 1> to <configuration 10>, wherein the program causes the computer to further implement:
- a dissimilarity determination function of determining whether or not the dissimilarity calculated in the dissimilarity calculation function is greater than a prescribed threshold value; and
- a defective range determination function of determining the prescribed range in which it is determined that the dissimilarity is greater than the prescribed threshold value in the dissimilarity determination function as a defective range.

<Configuration 12>

The non-transitory computer readable storage medium according to <configuration 11>, wherein the program causes the computer to further implement a defective range removal function of replacing a data part of the prescribed range determined to be the defective range in the defective range determination function with a data part of a result of synthesizing the data of the two or more channels within the data of the channels not selected in the selection function.
<Configuration 13>
The non-transitory computer readable storage medium according to <configuration 11>, wherein the program causes the computer to further implement a defective data exclusion function of excluding the attention channel data including the prescribed range determined to be the defective range in the defective range determination function when a prescribed process based on a plurality of pieces of the attention channel data is executed.
<Configuration 14>
The non-transitory computer readable storage medium according to any one of <configuration 11> to <configuration 13>, wherein the program causes the computer to further implement a threshold value decision function of deciding on the threshold value on the basis of a statistical result of the dissimilarity of each range of the attention channel data using the dissimilarity obtained for each range that is the same as or different from the prescribed range.
<Configuration 15>
The non-transitory computer readable storage medium according to any one of <configuration 1> to <configuration 14>, wherein the prescribed range includes two or more different ranges.
<Configuration 16>
The non-transitory computer readable storage medium according to any one of <configuration 1> to <configuration 15>, wherein the prescribed range is a range for one sample of the attention channel data.
<Configuration 17>
The non-transitory computer readable storage medium according to any one of <configuration 1> to <configuration 16>, wherein the data of the plurality of channels is time-series data, and wherein the prescribed range is a time period range.
<Configuration 18>
The non-transitory computer readable storage medium according to any one of <configuration 1> to <configuration 17>,
wherein the data of the plurality of channels is data arranged according to a spatial arrangement, and
wherein the prescribed range is a spatial range.
<Configuration 19>
An information processing device comprising:
an acquisition unit configured to acquire data of a plurality of channels that are three or more channels;
a selection unit configured to select data of a single channel as attention channel data from the data of the plurality of channels acquired by the acquisition unit; and
a dissimilarity calculation unit configured to calculate dissimilarity for data of two or more channels within data of channels not selected by the selection unit in each prescribed range of the attention channel data with respect to the attention channel data selected by the selection unit.
<Configuration 20>
An information processing method comprising:
acquiring, by an acquisition unit of an information processing device, data of a plurality of channels that are three or more channels;
selecting, by a selection unit of the information processing device, data of a single channel as attention channel data from the data of the plurality of channels acquired by the acquisition unit; and
calculating, by a dissimilarity calculation unit of the information processing device, dissimilarity for data of two or more channels within data of channels not selected by the selection unit in each prescribed range of the attention channel data with respect to the attention channel data selected by the selection unit.
<Configuration 21>
An information processing system including a sensor unit configured to measure data of a plurality of channels that are three or more channels and an information processing device,
wherein the information processing device includes:
an acquisition unit configured to acquire the data of the plurality of channels that are the three or more channels measured by the sensor unit;
a selection unit configured to select data of a single channel as attention channel data from the data of the plurality of channels acquired by the acquisition unit; and
a dissimilarity calculation unit configured to calculate dissimilarity for data of two or more channels within data of channels not selected by the selection unit in each prescribed range of the attention channel data with respect to the attention channel data selected by the selection unit.

DESCRIPTION OF REFERENCES

1 Information processing system
11 Information processing device
12 A/D converter
13 Display device
21 Belt conveyor
31, 611 Sensor unit
41 Table
42 Current supply unit
51 Target object
61 Rotation center axis
62 Rotation direction
111 Input unit
112 Output unit
113 Communication unit
114 Storage unit
115 Processing unit
131 Acquisition unit
132 Selection unit
133 Synthetic data generation unit
134 Dissimilarity calculation unit
135 Dissimilarity determination unit
136 Defective range determination unit
137 Defective range removal unit
138 Defective data exclusion unit
139 Threshold value decision unit
311, 321 Lower limit value
312, 322 Upper limit value
313, 323 Window
351, 352 Comparison
361 to 363 Movement direction
411, 521 Threshold value
431, 432 Unexpected noise part
511 Normal noise range
512 Unexpected noise range
1011, 1021, 1031, 1041, 1051, 1311, 1411, 1511 Measured signal
1111 Synthetic signal 1211 Dissimilarity characteristics
1611 Average signal
1612 Average signal without unexpected noise
1613 Average signal with unexpected noise
2011, 2021, 2022 Unexpected noise
3011 to 3015, 3031 to 3035, 3041 to 3045, 3051 to 3055, 3111 to 3115 Peak position
3311 to 3313 Spike noise part
3411, 3412 Block noise part
3511 to 3515 Block noise
3611 to 3615 Noise part
A-1 to A-n, B-11 to B-ij Sensor

What is claimed is:

1. A non-transitory computer readable storage medium storing a program for causing a computer to implement:
   an acquisition function of acquiring data of a plurality of channels that includes three or more channels;
   a selection function of selecting a single channel from the plurality of channels as an attention channel, and selecting data of the attention channel as attention channel data from the data of the plurality of channels acquired in the acquisition function; and
   a dissimilarity calculation function of calculating dissimilarity for data of two or more channels within data of channels not selected in the selection function in each prescribed range of the attention channel data with respect to the attention channel data selected in the selection function,
   wherein the data of the plurality of channels and the prescribed range are: time series data and a time period range, respectively; data arranged according to a spatial arrangement and a spatial range, respectively; or time-series data arranged according to a spatial arrangement and a range having both of a time period range and a spatial range, respectively.

2. The non-transitory computer readable storage medium according to claim 1,
   wherein the program causes the computer to further implement a synthetic data generation function of generating synthetic data that is a result of synthesizing the data of the two or more channels within the data of the channels not selected in the selection function, and
   wherein the dissimilarity for the synthetic data generated in the synthetic data generation function is calculated in the dissimilarity calculation function.

3. The non-transitory computer readable storage medium according to claim 2, wherein the synthetic data is generated by regulating a weight for synthesizing the data of the two or more channels within the data of the channels not selected in the selection function in an error least squares approximation process for the attention channel data in the synthetic data generation function.

4. The non-transitory computer readable storage medium according to claim 2, wherein the dissimilarity based on a sum of absolute values of differences between the attention channel data and the synthetic data is calculated in the dissimilarity calculation function.

5. The non-transitory computer readable storage medium according to claim 2, wherein the dissimilarity based on a sum of squares of differences between the attention channel data and the synthetic data is calculated in the dissimilarity calculation function.

6. The non-transitory computer readable storage medium according to claim 2, wherein the dissimilarity based on a maximum value of absolute values of differences between the attention channel data and the synthetic data is calculated in the dissimilarity calculation function.

7. The non-transitory computer readable storage medium according to claim 2, wherein the dissimilarity based on a difference between a feature quantity of the attention channel data and a feature quantity of the synthetic data is calculated in the dissimilarity calculation function.

8. The non-transitory computer readable storage medium according to claim 2, wherein the dissimilarity based on a difference between a probability distribution of the attention channel data and a probability distribution of the synthetic data is calculated in the dissimilarity calculation function.

9. The non-transitory computer readable storage medium according to claim 2, wherein the dissimilarity based on a difference between a power spectrum of the attention channel data and a power spectrum of the synthetic data is calculated in the dissimilarity calculation function.

10. The non-transitory computer readable storage medium according to claim 2, wherein the dissimilarity using an arithmetic equation for causing samples of the attention channel data and the synthetic data to correspond to each other is calculated in the dissimilarity calculation function.

11. The non-transitory computer readable storage medium according to claim 1, wherein the program causes the computer to further implement:
    a dissimilarity determination function of determining whether or not the dissimilarity calculated in the dissimilarity calculation function is greater than a prescribed threshold value; and
    a defective range determination function of determining the prescribed range in which it is determined that the dissimilarity is greater than the prescribed threshold value in the dissimilarity determination function as a defective range.

12. The non-transitory computer readable storage medium according to claim 11, wherein the program causes the computer to further implement a defective range removal function of replacing a data part of the prescribed range determined to be the defective range in the defective range determination function with a data part of a result of synthesizing the data of the two or more channels within the data of the channels not selected in the selection function.

13. The non-transitory computer readable storage medium according to claim 11, wherein the program causes the computer to further implement a defective data exclusion function of excluding the attention channel data including the prescribed range determined to be the defective range in the defective range determination function when a prescribed process is executed, and
    wherein the prescribed process is executed by using a plurality of pieces of data which is acquired as data of the attention channel,
    process based on a plurality of pieces of the attention channel data is executed.

14. The non-transitory computer readable storage medium according to claim 11, wherein the program causes the computer to further implement a threshold value decision function of deciding on the threshold value on the basis of a statistical result of the dissimilarity of each range of the attention channel data using the dissimilarity obtained for each range that is the same as or different from the prescribed range.

15. The non-transitory computer readable storage medium according to claim 1, wherein the prescribed range includes two or more different ranges.

16. The non-transitory computer readable storage medium according to claim 1, wherein the prescribed range is a range for one sample of the attention channel data.

17. The non-transitory computer readable storage medium according to claim 1,
wherein the data of the plurality of channels is time-series data, and
wherein the prescribed range is a time period range.

18. The non-transitory computer readable storage medium according to claim 1,
wherein the data of the plurality of channels is data arranged according to a spatial arrangement, and
wherein the prescribed range is a spatial range.

19. An information processing device comprising:
an acquisition unit configured to acquire data of a plurality of channels that includes three or more channels;
a selection unit configured to select a single channel from the plurality of channels as an attention channel, and select data of the attention channel as attention channel data from the data of the plurality of channels acquired by the acquisition unit; and
a dissimilarity calculation unit configured to calculate dissimilarity for data of two or more channels within data of channels not selected by the selection unit in each prescribed range of the attention channel data with respect to the attention channel data selected by the selection unit,
wherein the data of the plurality of channels and the prescribed range are: time series data and a time period range, respectively; data arranged according to a spatial arrangement and a spatial range, respectively; or time-series data arranged according to a spatial arrangement and a range having both of a time period range and a spatial range, respectively.

20. An information processing method comprising:
acquiring, by an acquisition unit of an information processing device, data of a plurality of channels that includes three or more channels;
selecting, by a selection unit of the information processing device, a single channel from the plurality of channels as an attention channel;
selecting, by the selection unit of the information processing device, data of the attention channel as attention channel data from the data of the plurality of channels acquired by the acquisition unit; and
calculating, by a dissimilarity calculation unit of the information processing device, dissimilarity for data of two or more channels within data of channels not selected by the selection unit in each prescribed range of the attention channel data with respect to the attention channel data selected by the selection unit,
wherein the data of the plurality of channels and the prescribed range are: time series data and a time period range, respectively; data arranged according to a spatial arrangement and a spatial range, respectively; or time-series data arranged according to a spatial arrangement and a range having both of a time period range and a spatial range, respectively.

21. An information processing system including a sensor unit configured to measure data of a plurality of channels that includes three or more channels and an information processing device,
wherein the information processing device includes:
an acquisition unit configured to acquire the data of the plurality of channels that includes the three or more channels measured by the sensor unit;
a selection unit configured to select a single channel from the plurality of channels as an attention channel and select data of the attention channel as attention channel data from the data of the plurality of channels acquired by the acquisition unit; and
a dissimilarity calculation unit configured to calculate dissimilarity for data of two or more channels within data of channels not selected by the selection unit in each prescribed range of the attention channel data with respect to the attention channel data selected by the selection unit,
wherein the data of the plurality of channels and the prescribed range are: time series data and a time period range, respectively; data arranged according to a spatial arrangement and a spatial range, respectively; or time-series data arranged according to a spatial arrangement and a range having both of a time period range and a spatial range, respectively.

* * * * *